United States Patent
Bakin

(10) Patent No.: US 12,506,973 B1
(45) Date of Patent: Dec. 23, 2025

(54) ADAPTIVE ILLUMINATION USING VERTICAL CAVITY SURFACE EMITTING LASER (VCSEL) ARRAY

(71) Applicant: Amazon Technologies, Inc., Seattle, WA (US)

(72) Inventor: Dmitry V Bakin, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 126 days.

(21) Appl. No.: 18/343,674

(22) Filed: Jun. 28, 2023

(51) Int. Cl.
*H04N 23/74* (2023.01)

(52) U.S. Cl.
CPC .................... *H04N 23/74* (2023.01)

(58) Field of Classification Search
CPC ...... H04N 23/74; H04N 23/56; H04N 13/254; H04N 13/296; H04N 13/128; H04N 13/232; H04N 13/243; H04N 23/16; H04N 13/0088; H01S 5/026; H01S 5/18388; H01S 5/423; H01S 5/0014; H01S 5/005; H01S 5/0234; H01S 5/02345; H01S 5/0237; H01S 5/02469; H01S 5/04256; H01S 5/04257; H01S 5/06226; H01S 5/18311; H01S 5/18347; H01S 2301/176; G01S 7/481; G01S 17/894; G01S 17/89; G06T 23/74; G06T 7/593; G06T 7/557; G06T 7/85; G06T 15/20; G06T 2200/21; G06T 2207/10012; G06T 2207/10024; G06T 2207/10052; G06T 7/55

See application file for complete search history.

(56) References Cited

U.S. PATENT DOCUMENTS 8,619,082 B1   12/2013   Ciurea et al.
12,044,374 B2  7/2024    Okahisa
(Continued)

FOREIGN PATENT DOCUMENTS

JP   2007-096684 A   4/2007
JP   5438414 B2      3/2014

OTHER PUBLICATIONS

"Ring doorbell pro can't see a night due to infrared light reflecting off my wall", reddit.com, https://www.reddit.com/r/Ring/comments/s8m9ui/ring_doorbell_pro_cant_see_a_night_due_to/, visited Aug. 1, 2023 in 6 pages.

Primary Examiner — Lin Ye
Assistant Examiner — Tuan H Le
(74) Attorney, Agent, or Firm — Knobbe Martens Olson & Bear LLP

(57) ABSTRACT

Systems and methods are provided for managing illumination associated with image capture by devices by adjusting illumination in one or more sub-portions of an area during image capture. In order to adjust illumination, configuration data may be obtained relating to image data generated by an image capture device. The image capture device may be associated with a controllable illumination device configured to provide independently controllable illumination for at least two sub portions of an area. The controllable illumination device may cause the generation of illumination based on independent illumination attributes associated with the at least two sub-portions. The illumination device can include independently controllable illumination units can include a VCSEL array in which individual segments of the VCSEL array are independently controllable.

21 Claims, 15 Drawing Sheets

(56) References Cited

U.S. PATENT DOCUMENTS

| | | |
|---|---|---|
| 2009/0008530 A1 | 1/2009 | Wernersson |
| 2009/0022393 A1 | 1/2009 | Bar-Zohar et al. |
| 2010/0091119 A1 | 4/2010 | Lee |
| 2012/0321172 A1 | 12/2012 | Jachalsky et al. |
| 2013/0266326 A1* | 10/2013 | Joseph ............... H04B 10/1141 398/130 |
| 2013/0272582 A1 | 10/2013 | Schlosser et al. |
| 2016/0164261 A1* | 6/2016 | Warren ................. H04N 23/56 372/50.122 |
| 2018/0157342 A1* | 6/2018 | Romano ................ G06V 40/28 |
| 2021/0200064 A1 | 7/2021 | Van Der Sijde et al. |
| 2023/0069917 A1 | 3/2023 | Krivopisk et al. |
| 2024/0267602 A1* | 8/2024 | Beaudet ................ H04N 23/55 |

\* cited by examiner

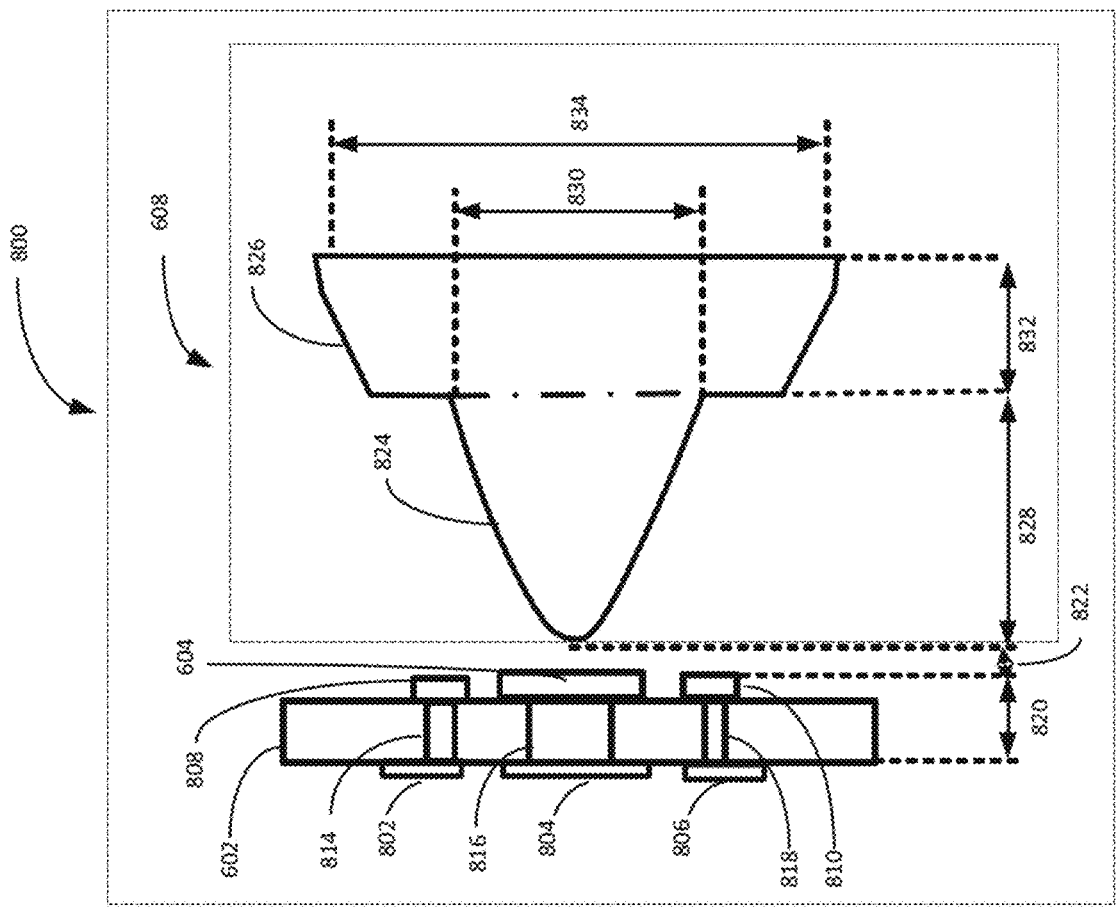
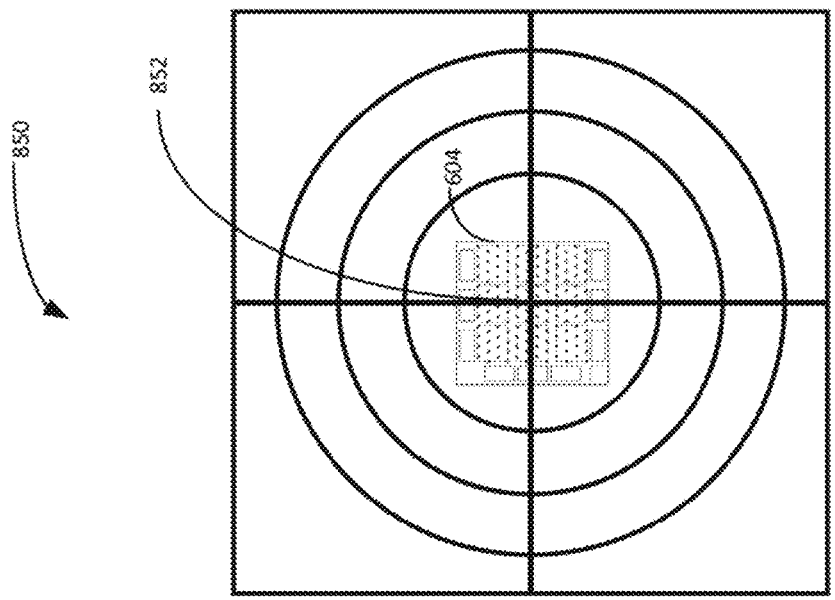
FIG. 8A
FIG. 8B

ADAPTIVE ILLUMINATION USING VERTICAL CAVITY SURFACE EMITTING LASER (VCSEL) ARRAY

BACKGROUND

Generally described, image capture devices, such as video imaging devices, static/still imaging devices, etc., can be incorporated into a variety of applications and systems (e.g., security camera devices, video doorbell devices, etc.). In some applications, image capture devices can rely on natural lighting in an area (e.g., sunlight or other light sources) during image capture. Such natural sources of light may be inconsistent or temporal in nature. Accordingly, some image capture devices can be directly or indirectly configured to work with illumination components or illumination devices that provide illumination on the physical areas that are associated with captured image data (e.g., captured video image data, captured still image data, etc.) and that are captured within the field of view (FOV) of the image capture device. In certain scenarios, similar to natural lighting, the use of supplemental illumination can result in underexposed captured image data or overexposed captured image data.

Managing illumination associated with image capture, in general, often involves enhancing details in the dark and bright areas of the image data. A common technique involves capturing multiple images of the same area at different exposure levels and combining them to create one image with an expanded dynamic range. For example, an image of an area may be taken at a lower exposure level and another image may be taken at a higher exposure level. Details obtained from the lower exposure image may provide more detail in bright portions of the image and details obtained from the higher exposure image may provide more detail in darker portions of the image. Combining information from the lower exposure and higher exposure image can result in more details being captured for a combined image. There will typically be a time delay in between capture of images at different exposure levels. This technique requires that there be no significant changes to the area in the time delays between capture of the images.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

FIG. 8A-B illustrates an example embodiment of an illumination device where an optical element is aligned over the center of an array of illumination units.

DETAILED DESCRIPTION

Figure 1:
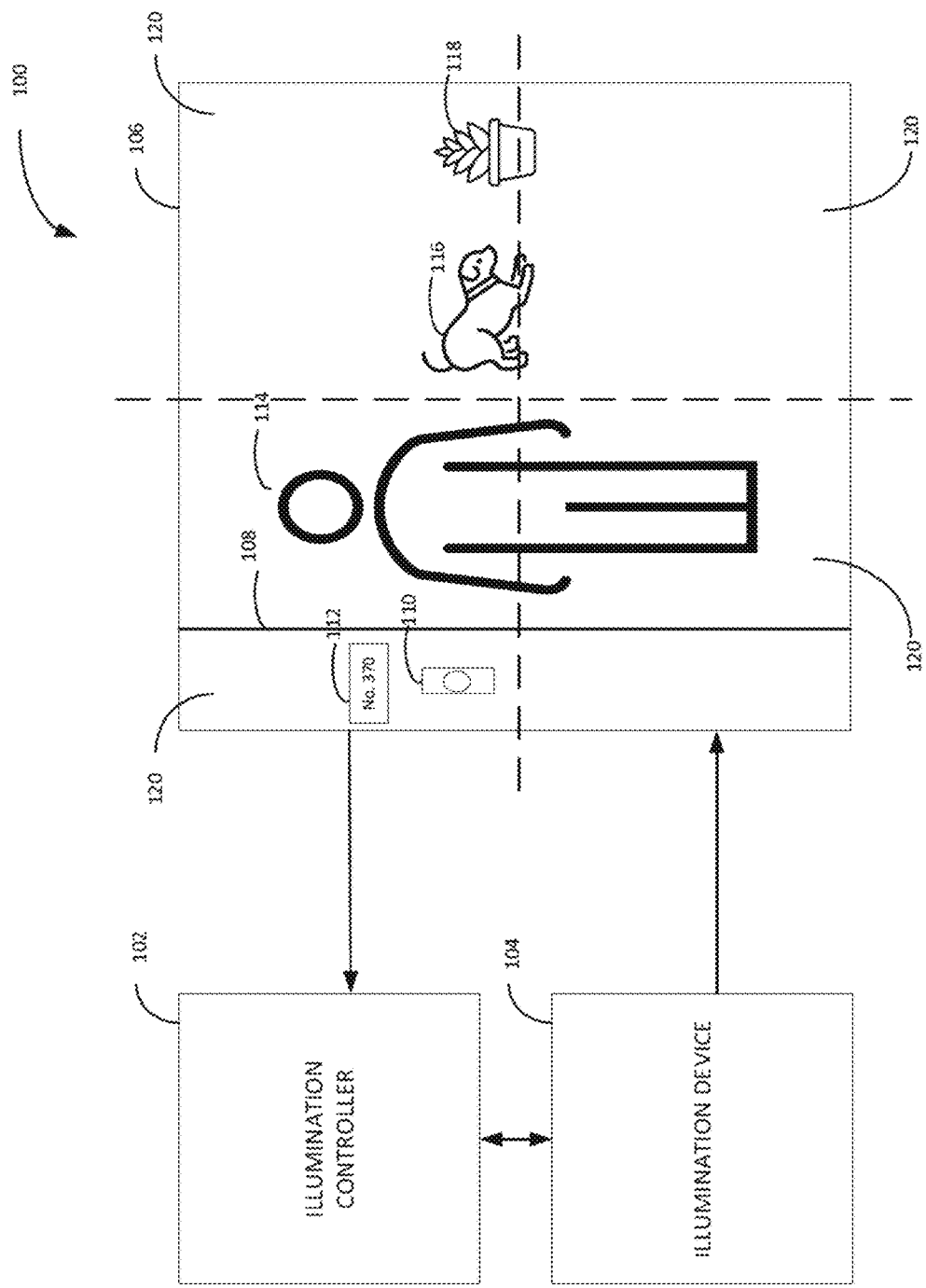
FIG. 1 illustrates an example system including an illumination control configured to dynamically adjust illumination provided by an illumination device in an image capture area.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Generally described, aspects of the present disclosure relate to managing illumination associated with image capture by adjusting illumination in a camera's field of view (FOV) in response to image data obtained from one or more sensors. More specifically, aspects of the present disclosure correspond to systems and methods for managing illumination associated with a camera's FOV to minimize loss of detail in captured images from underexposure or overexposure. As will be described in more detail below, aspects of the present disclosure correspond to the utilization of independently controllable illumination units, or light sources, to adjust illumination in independent sub-portions of a camera's FOV. In some aspects, illumination units provide independent illumination of distinct parts of the FOV with adaptable intensity.

Adjustment may utilize or be based on data or feedback generated by or obtained from one or more image sensors or image capture devices. In some aspects, data or feedback may be related to changes in illumination in a camera FOV, captured images, or an image capture area over time. The data or feedback may specify in which sub-portions of a camera FOV or captured image the illumination has changed and in which sub-portions, if any, that the illumination has not changed. In some aspects, this data or feedback may be used, at least in part, to illuminate the image capture area such that some or all sub-portions of a generated image are illuminated with a similar intensity. This may improve capture of details in image data for some or all sub-portions of the image.

In accordance with other aspects of the present disclosure, the independently controllable illumination units may be part of an illumination chip. In some aspects, the illumination chip may be divided into segments and each segment may be an illumination unit. The individually controllable illumination units can include a light emitting vertical cavity surface emitting laser (VCSEL) array in which individual segments of the VCSEL array are independently controllable. Such independent control can include the adjustment of various illumination properties or attributes, such as activation, deactivation, adjustment of brightness or luminance, and the like.

According to some aspects of the present disclosure, a VCSEL array may be divided into individually controllable segments laid out in a matrix. The individually controllable segments may also be coupled to or disposed on a substrate. The VCSEL array can further be associated with additional components or configurations that facilitate the direction of light generated by the array, such as according to a specified or desired illumination pattern. In one example, a camera device with integrated controllable illumination units or independently controllable illumination units can include optical elements that are configured to direct illumination provided by one or more segments of a VCSEL array to illuminate one or more sub-portions of a camera's FOV. The optical elements may refract or redirect light received at the optical element in some embodiments or disperse light received at the optical element in other embodiments.

Existing systems for adjusting illumination for image capture include systems utilizing high dynamic range (HDR) methods. These methods may involve taking images at different levels of exposure of within a camera's FOV encompassing an image capture area. For example, an image may be taken at a lower exposure level and another image may be taken at a higher exposure level. Details obtained from the lower exposure image may provide more detail in bright portions of the image and details obtained from the higher exposure image in darker portions of the image. Combining information from the lower exposure and higher exposure images may result in more details being captured.

One potential deficiency associated with this approach can arise in situations when objects in the camera's FOV change position between images being collected. This creates what is commonly referred to as a "ghosting" artifact.

Other types of problems associated with improving detail captured in images include "part-wall" challenges (e.g., when part of a wall is close to the camera). In some aspects, the portion of the wall close (or other obstruction) to the camera becomes overexposed or oversaturated. For example, in some aspects, image capture may occur at night and the image capture area may be illuminated with light in the IR spectrum. This light may reflect off of the obstruction, causing a corresponding sub-portion of a captured image to appear overexposed. In some aspects, important details may be present in this sub-portion of the FOV of the image capture device (e.g., a person). A straightforward approach for correcting overexposure in this sub-portion may result in underexposure of other sub-portions resulting in loss of detail in the image data collected.

Another deficiency associated with existing technologies relates to power consumption. For example, sometimes, in order to illuminate dim areas of an image capture area, illumination is increased in all sub-portions of a camera FOV encompassing an image capture area. This may result in increased power consumption by the image capture device. Where the image capture device relies on battery power, this increased power usage can result in shortened battery life or device unavailability based on insufficient power resources.

Additional problems relate to existing solar radiation filtering methods for systems using a multi-function image capture device configured to capture images according to different wavelengths/spectrums, namely, visible light (e.g., red, green, blue (RGB) wavelengths) and the infrared (IR) wavelengths. During the day, solar radiation impacts color fidelity in captured images corresponding to the visible light wavelengths. At night, IR illumination is used to capture images in view of the lack of visible light. The range of solar radiation frequencies includes frequencies in the IR spectrum. Existing systems can incorporate a notch filter allowing a band of IR frequencies to be emitted/received while blocking remaining frequencies. However, when implemented during the day, the allowed band of frequencies in notch filters must be narrow to effectively block out solar radiation. Typically, existing emitters, such as IR LEDs, have only been able to emit light at a much wider band of frequencies. This leads to loss of color fidelity, which can impact image quality. This also leads to loss of power and corresponding increased power consumption. Other types of loss are also possible.

One or more approaches applied by the present disclosure improve upon deficiencies or errors of existing technologies in various ways by facilitating independent control of illumination captured in one or more sub-portions of a camera's field of view. Illustratively, adjusting illumination independently by controlling illumination applied to individual sub-portions mitigates "ghosting" artifacts by eliminating the need to capture multiple images at multiple different exposure levels. In addition, independent adjustment of illumination for individual sub-portions, according to some aspects, results in objects within the camera's field of view being illuminated at the same average intensity. This may reduce the chance of overexposure and underexposure and improve the amount of detail captured in the image data. Furthermore, according to some aspects of the present disclosure, if some sub-portions of a camera's field of view require illumination at a high intensity, power consumption can be reduced by use of independent illumination of high intensity of only those sub-portions. Additionally, use of a VCSEL array for at least a portion of the controllable illumination units allow for emission of light at narrower frequency bands than existing emitters, such as IR LEDs. When used in systems with an RGB-IR cameras, this may lead to reduced loss of color fidelity which may improve image quality. Additionally, this may lead to reduced loss of power and corresponding reduced power consumption relative to system incorporating existing emitters or image capture functionality. Reduced power consumption and overall power usage may also extend battery life in implementations where the image capture device obtains power, at least in part, from a battery.

These and other aspects of the disclosure will now be described with regard to certain examples and embodiments, which are intended to illustrate but not limit the disclosure. Although the examples and embodiments described herein will focus on, for the purpose of illustration, specific calculations and algorithms, one of skill in the art will appreciate the examples are illustrative only and are not intended to be limiting.

FIG. 1 illustrates an example system 100 configured to dynamically adjust illumination in a camera's FOV 106 using an illumination controller 102 and an illumination device 104. Illumination controller 102 may be configured to obtain and process image data for a camera's FOV 106 and determine whether adjustments need to be made to illumination for a camera's FOV 106. The camera's field of view may encompass an image capture area. Adjustments may be made independently to individual sub-portions 120 of a camera's FOV 106. For illustrative purposes, sub-portions 120 can correspond to two or more sub-divisions of the FOV. The sub-portions 120 may be illustrative of equal size or uniform dimensions, and may be associated with some form of geometric shape, such as rectangles, circles, semi-circles, etc. In accordance with one or more preferred implementations, one or more sub-portions may not be a geometric shape. The sub-portions 120 may include sub-portions having non-uniform shapes and dimensions (relative to the other sub-portions). The sub-portions may change shape. For example, in some embodiments, adjustments may be made to the shape of the sub-portions to adjust illumination (e.g., by receipt of instructions from the illumination controller). The number of sub-portions or configuration of the sub-portions implemented in accordance with the present disclosure is not limited to the illustrative examples.

Illumination device 104 may be configured to receive instructions from illumination controller 102 and implement adjustments to illumination for a camera's FOV 106. For example, instructions may be received by a first processor in illumination device 104 from a second processor in illumination controller 102. Different illumination adjustments may be made to individual sub-portions 120 of the camera's FOV 106. For example, as will be discussed in more detail below, the different illumination adjustments may be made to adjust lighting for different objects within a camera's FOV 106. In some embodiments, one or more sub-portions 120 may be excluded from image adjustments. The exclusion determination may be made automatically, through use of user input, or some combination thereof. Additionally, or alternatively, in some embodiments, the same illumination adjustments may be made for all of sub-portions 120.

Light emitted to one or more sub-portions may form an illumination pattern. For example, light emitted to at least two sub-portions 120 may form an illumination pattern. In some embodiments, sub-portions 120 may overlap. In some embodiments, illumination directed to at least two sub-portions 120 may overlap to form an illumination pattern. In other embodiments, there may be no overlap in different sub-portions 120. Additionally, or alternatively, illumination directed to at least two sub-portions 120 may not overlap.

In accordance with one or more preferred implementations, sub-portions for a field of view of a camera may be defined or specified with reference to pixel locations for image data generated by the camera.

In accordance with one or more preferred implementations, sub-portions for a field of view of a camera may be defined or specified by horizontal and/or vertical angular measurements, e.g., a camera with a 150-degree horizontal field of view may be defined to include three sub-portions, each encompassing a 50-degree horizontal sweep through the field of view.

Illumination controller 102 may obtain image data through use of an image capture device (e.g., a camera device). Additionally, or alternatively, the image capture device may utilize one or more image sensors to capture image data. Image sensors may include, but are not limited to, a complementary metal oxide semiconductor (CMOS) sensor, a charge coupled device, an active pixel sensor, another type of image capture device, or some combination thereof. In some embodiments, the image capture device may be internal to illumination controller 102. In other embodiments, the image capture device may be housed separately from illumination controller 102.

Illumination controller 102 may obtain image data of a camera's FOV 106. Image data may be obtained from an image capture device. In some embodiments, image data may be captured during the day. In other embodiments, the image data may be captured at night. In further embodiments, the image capture may occur in the transition period between day and night (e.g., a detected sunset or defined sunset) or in the transition period between night and day (e.g., a detected sunrise or defined sunrise). Illumination controller 102 may determine adjustment to illumination based at least in part on the time of day.

In addition, image data may be obtained continuously. Additionally, or alternatively, image data may be obtained for a collection period. The collection period may be triggered by an event (e.g., detection of movement, start of a day, start of a night, etc.). Additionally, or alternatively, image data may be obtained at intervals. For example, image data may be obtained during collection periods that reoccur at set intervals of time.

In accordance with one or more preferred implementations, a camera device is configured to activate a camera and generate image data in the form of a snapshot at periodic intervals, e.g., once every ten minutes or once every hour.

In accordance with one or more preferred implementations, a camera device is configured to activate a camera and generate image data in the form of video in response to user input via an app loaded on a mobile device of a user, e.g., in response to a request to view a live video feed from the camera device.

In accordance with one or more preferred implementations, a camera device is configured to activate a camera and generate image data in the form of video in response to motion detected by a motion detector of the camera device, e.g., a passive infrared sensor.

Illumination controller 102 may also utilize image data as feedback. For example, illumination controller 102 may determine to make a first adjustment based on received image data during a first collection period. Subsequently, image data may be obtained for a second collection period. The image data from the second collection period may be compared to the image data from the first collection period to determine whether additional adjustments need to be made. Data collected over more than one collection period may be compared to determine whether an adjustment needs to be made.

Additionally, or alternatively, illumination controller 102 may determine to adjust illumination for a camera's FOV 106 after comparison of sub-portions 120 of a captured image to one or more thresholds (e.g., based on stored sub-portion data for captured images or based on stored sub-portion data for a field of view of a camera or based on correspondence to a sub-portion of a field of view of a camera for which data is stored). An entire image may also be compared against the one or more thresholds. The one or more thresholds may be illumination thresholds or time-based thresholds. Illumination thresholds may include brightness thresholds and dimness thresholds. A brightness threshold may be exceeded if the sub-portion(s) 120 being considered is or are determined to be overexposed. A dimness threshold may be exceeded if sub-portion(s) 120 being considered is or are determined to be underexposed. An illumination threshold may be an absolute threshold. Additionally, or alternatively, an illumination threshold may be a normalized threshold. In some embodiments, an illumination threshold may be set by illumination controller 102 based on an average illumination intensity. Average illumination intensity may be calculated from illumination data collected for one or more collection periods. Additionally, in other embodiments, an illumination threshold may be set by illumination controller 102 based on a normalized illumination intensity.

Time-based thresholds may be exceeded if an illumination threshold has been exceeded for a preset period of time. For example, in a non-limiting embodiment, if a first illumination threshold is exceeded for a first preset period of time, a first time-based threshold may be exceeded. Time-based thresholds may be specified by a user. Additionally, or alternatively, time-based thresholds may be specified by a system administrator. Of course, other parties may also specify the time-based thresholds. Specifying a time-based threshold may include specifying the preset period of time for which an absolute illumination threshold associated with the time-based threshold may be exceeded.

A camera's FOV 106 may contain objects that have different properties. These properties may be relevant in determining whether an object meets or exceeds a threshold. Properties of an object may include, but are not limited to, proximity to illumination controller 102, distance from illumination controller 102, whether the object is static (not in motion), whether the object is dynamic (in motion), and the sub-portion 120 in which the object is located. Furthermore, an object's properties may change over time. For example, a camera's FOV 106 may contain the objects: wall 108, doorbell 110, sign 112, person 114, dog 116, and plant 118. Objects wall 108, doorbell 110, sign 112, and person 114 may be considered to have the properties of being close and static. However, one or more objects that are considered close and static may move further away, thereby changing their properties from close to far and from static to dynamic.

For example, in one non-limiting embodiment, person 114 may have the properties of close and static. Person 114 may move further away. The movement may reflect a decision by the person to approach another object (e.g., dog 116). During the movement period, the properties of the object may change (e.g., from static to dynamic). Object properties may change again (e.g., from dynamic to static, from close to far, etc.) when person 114 reaches a destination. In another non-limiting embodiment, dog 116 may initially have the properties of far and dynamic and represent an animal. Plant 118 may be an object that is typically static, but may become dynamic (e.g., if dog 116 contacts plant 118).

Changes in properties (e.g., whether one or more objects have a dynamic property) may be used to determine whether to adjust illumination. For example, in a non-limiting embodiment, illumination controller 102 may determine to make an adjustment to the illumination but wait to implement the adjustment until no objects in the image capture area have a dynamic property. In some embodiments, sensors (e.g., motion sensors, image sensors, etc.) may be used to detect objects, object properties, and/or changes in object properties. For example, illumination controller 102 may be configured to receive input from sensor and determine objects and object properties based at least in part on this input. Additionally, or alternatively, in some embodiments, machine learning models may be employed to detect objects, object properties, and/or changes in object properties.

After making a determination to adjust illumination, illumination controller 102 may transmit instructions to adjust illumination to illumination device 104. Illumination device 104 may be configured to receive instructions from illumination controller 102 and implement the instructions to adjust illumination. For example, illumination device 104 may include a controller to control one or more illumination units. The illumination units may be configured for individual control. The controller may be configured to receive control instructions corresponding to individual control of each illumination unit. For example, each illumination unit may be assigned an individual driver channel.

Additionally, or alternatively, illumination units may also be controlled in groups (e.g., two units may be associated with a single channel). Instructions to illumination device 104 may include instructions to adjust illumination for one or more sub-portions 120 (e.g., one or more sub-portions associated with a channel or segment of a VCSEL array). For example, each illumination unit may be associated with a particular sub-portion 120. An independent driver channel may be used to control all illumination units associated with a particular sub-portion 120.

As described above, in some embodiments, the one or more illumination units of illumination device 104 may include VCSEL emitters. The VCSEL emitters may be arranged in various configurations, such as in different matrix arrangements or disposed in segments on an integrated circuit (IC) chip. Additionally, or alternatively, the illumination device 104 may also include other types of illumination units (e.g., LEDs, incandescent bulbs, halogen bulbs, another type of illumination unit, or some combination thereof.). Illumination device 104 may also include one or more optical elements to facilitate directing light. The one or more optical elements may include, but are not limited to lenses, reflective structures, and diffusive coatings. The one or more optical elements may include an aspheric lens. The illumination device 104 may emit light having a wavelength or frequency in the IR spectrum. Of course, emission of light at other wavelengths and frequencies are also possible (e.g., in the UV spectrum, in the visible spectrum, or some combination thereof.)

Figure 2:
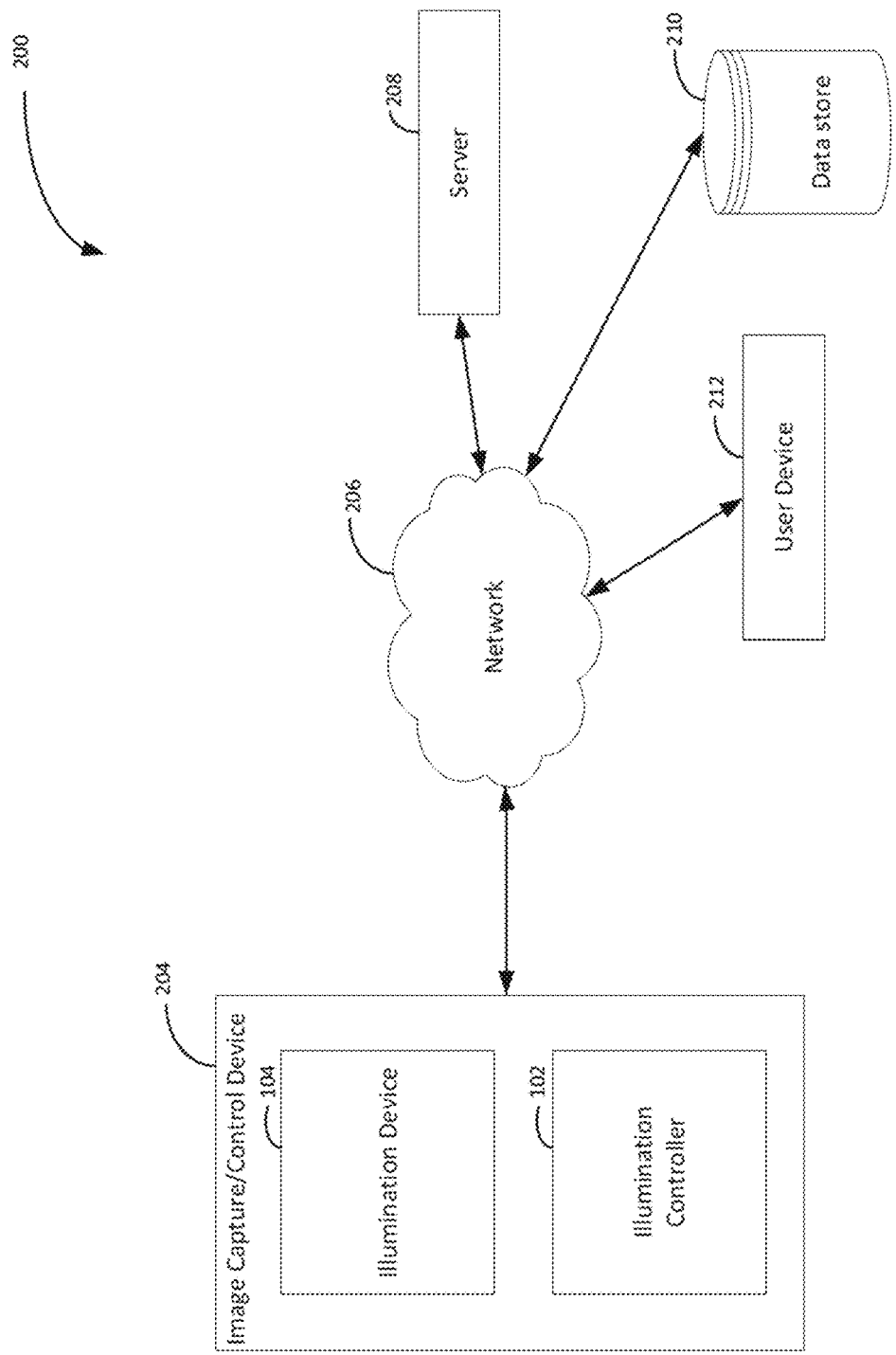
FIG. 2 illustrates example interactions between components of an example system to dynamically adjust lighting in an image capture area.

FIG. 2 illustrates example interactions between components of an example system to dynamically adjust lighting in an image capture area (e.g., camera's FOV 106 of FIG. 1). As illustrated in FIG. 2, the illumination device 104 and the illumination controller 102 may serve as components to form part of an image capture and control device 204. Image capture and control device 204 may be used to adjust illumination in a camera's FOV (e.g., camera's FOV 106 of FIG. 1). For example, in a non-limiting embodiment, an illumination controller component (e.g., illumination controller 102 of FIG. 1) of image capture and control device 204 may provide instructions for a controllable illumination component (e.g., illumination device 104 of FIG. 1) of image capture and control device 204 to generate illumination for individual sub-portions of the camera's FOV.

Image capture and control device 204 may communicate with a network 206. Network 206 may additionally be in communication with server 208, data store 210, and user device 212. Network 206 may be configured to facilitate communication between image capture and control device 204, server 208, data store 210, and user device 212.

For example, network 206 may receive instructions from user device 212 for image capture and control device 204. Additionally, or alternatively, communication with network 206 may include receipt of instructions from server 208. Image capture and control device 204 may also transmit data through network 206 to another device (e.g., data store 210 or user device 212).

User device 212 may be a mobile device associated with a user (e.g., a cellphone, a smart watch, another wearable device, etc.). In some embodiments, user device 212 may require authentication credentials to transmit and receive data originating from image capture and control device 204. In further embodiments, more than one user device may have authentication credentials to transmit and receive data originating from image capture and control device 204.

Figure 3:
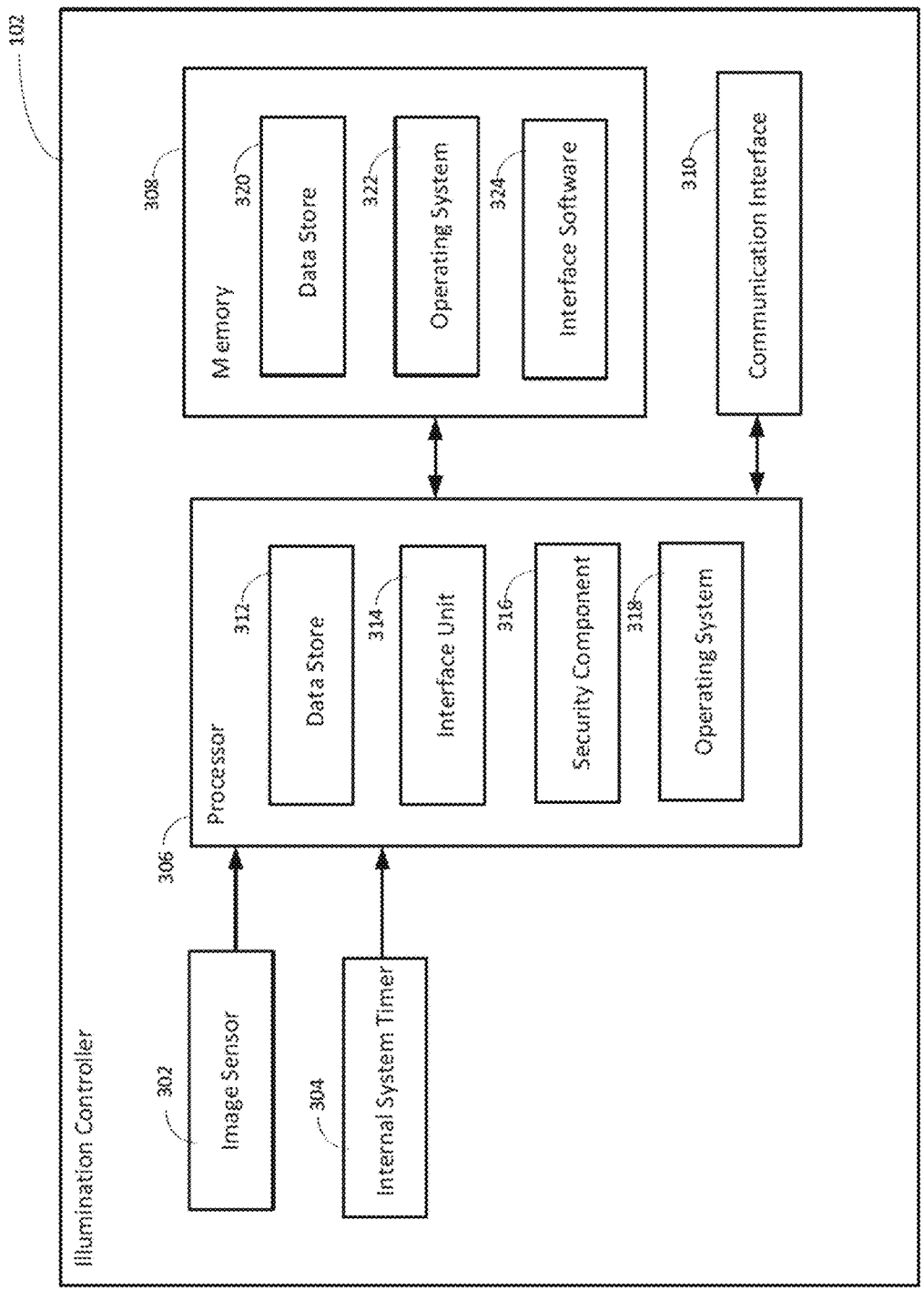
FIG. 3 schematically illustrates an illumination controller.

FIG. 3 schematically illustrates illumination controller 102. Illumination controller 102 may include image capture device 302, internal system timer 304, processor 306, and memory 308. As will be described in more detail below, each of these components may include additional sub-components. Regarding image capture device 302, image capture device 302 may be internal to illumination controller 102. In other embodiments, image capture device 302 may be external to illumination controller 102. In further embodiments, image capture device 302 may communication with illumination controller 102 through a network (e.g., network 206).

Illumination controller 102 may further include internal system timer 304. Internal system timer 304 may keep track of a clock time (e.g., a time relative to a particular time zone), or may count seconds or other units of time that have passed since an event (e.g., a trigger used to begin or end data collection). For example, processor 306 may trigger internal system timer 304 to start or stop depending based on an event (e.g., motion detection, start of a day, start of a night, etc.).

Internal system timer 304 may be used to determine when to obtain image data. For example, processor 306 may utilize timing information from internal system timer 304 to instruct image capture device 302 to collect image data for a collection period (e.g., 1 second) using the image capture device. In some embodiments, processor 306 can further use timing information from internal system timer 304 to generate instructions to image capture device 302 to collect image data for a collection period, wait for a set interval of time (e.g., 5 seconds) and collect image data for another collection period (e.g., 1 second). One skilled in the relevant art will appreciate that the disclosed time intervals are illustrative in nature and that additional or alternative time intervals may also be applicable.

Processor 306 may include data store 312, interface unit 314, security component 316, and operating system 318. Data store 312 may be configured to store data for a certain number of collection periods. Data store 312 may also contain instructions to apply to convert incoming image data, as will be discussed in more detail below. The amount of data to be stored in data store 312 may be set by the manufacturer. Additionally, or alternatively, a user or an administrator may limit the amount of data to be stored in data store 312. Data store 312 may be a temporary data store (e.g., RAM). Processor 306 may send data in data store 312 to memory 308 for further storage. Interface unit 314 may provide connectivity to one or more devices or components. For example, in some embodiments interface unit 314 may provide connectivity between illumination controller 102 and illumination device 104. Additionally, or alternatively, interface unit 314 may provide connectivity to other devices through network 206 of FIG. 2.

Security component 316 may facilitate secure communications with other devices. For example, in a non-limiting embodiment, security component 316 may facilitate the validation and processing of security credentials for one or more user devices (e.g., user device 212). In some embodiments, this communication to other devices may occur through a network (e.g., network 206). In other embodiments, security component 316 may not be present. Processor 306 may include an operating system 318 that provides computer program instructions for use in the general administration and operation of illumination controller 102.

Memory 308 may include computer program instructions that are executed by processor 306 in order to implement one or more embodiments. Memory 308 generally includes RAM, ROM or other persistent or non-transitory memory. These may be included as data store 320. Memory 308 may include an operating system 322 that provides computer program instructions for use by processor 306 in the general administration and operation of illumination controller 102. Memory 308 may further include computer program instructions and other information for implementing aspects of the present disclosure. For example, in one embodiment, memory 308 includes instructions regarding the amount of storage to be used over a period of time. In some embodiments, the memory 308 may include a storage for Interface Software 324. This may include information necessary for communication with one or more network devices by the communication interface 310. Communication interface 310 may be a separate component to provide connectivity to one or more networks or computing systems, such as the illumination device 104, server 208, data store 210, or user device 212 of FIGS. 1-2.

Example Methods for Implementing Adaptive Illumination

Figure 4:
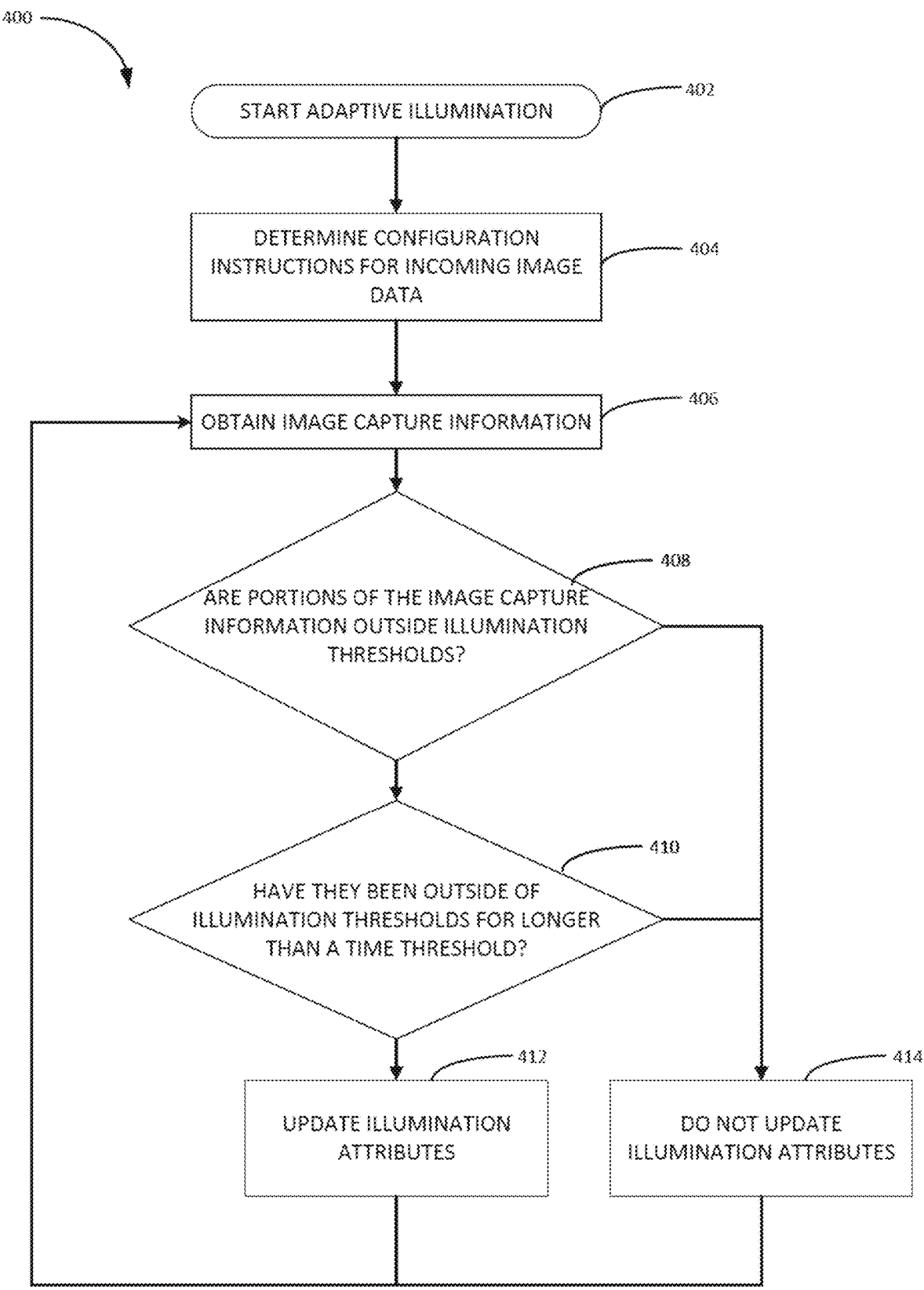
FIG. 4 illustrates an example method for adjusting illumination for an image capture area.
Figure 5:
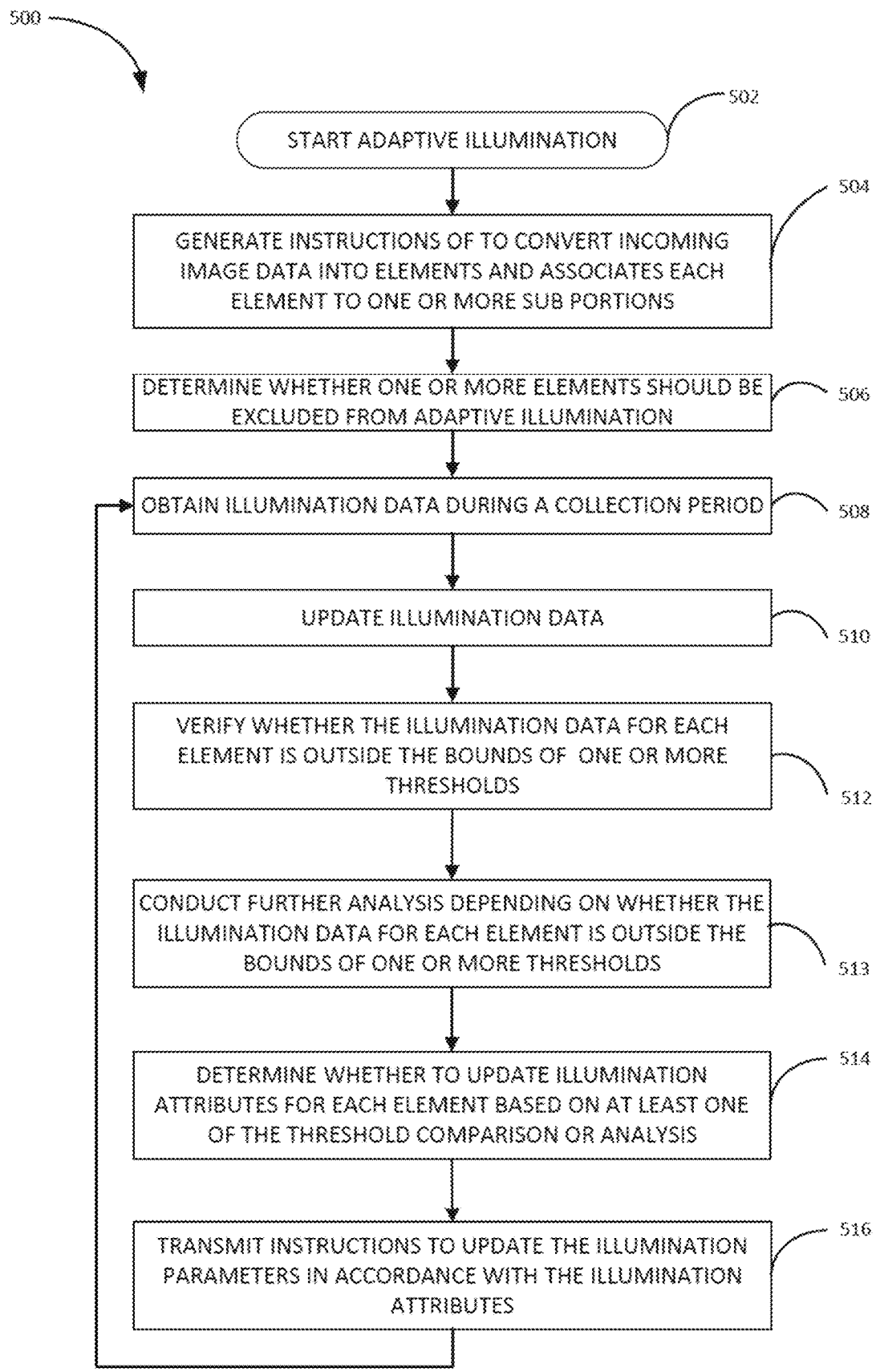
FIG. 5 illustrates another example method for adjusting illumination for an image capture area.

FIG. 4 illustrates and example method 400 for adaptive illumination. FIG. 5 illustrates another example method 500 for adaptive illumination. FIGS. 4 and 5 will be discussed in parallel to show similarities and differences between the example methods.

Example method 400 starts at block 402. Example method 500 starts at block 502. At block 404, configuration instructions are determined for incoming data. Determining configuration instructions can be performed by a processor (e.g., processor 306 of FIG. 3) Generating configuration instructions for incoming data may include generating instructions to extract illumination data from image capture information obtained from one or more image capture devices.

Additionally, or alternatively, such as at block 504, generating configuration instructions may include dividing the image data into elements and associate each element of the image data with at least one or more sub-portions of an FOV of the camera (e.g., sub-portions 120 of FIG. 1). Sub-portions may be representative of parts of an image capture area captured an image capture device. Additionally, or alternatively, sub-portions may be areas which can be illuminated independently by a controllable illumination component (e.g., illumination device 104 of FIGS. 1-2). As will be discussed in more detail below, changing the adjustable illumination attribute may result in illumination provided by the controllable illumination component (e.g., illumination device 104 of FIGS. 1-2).

Figure 11:
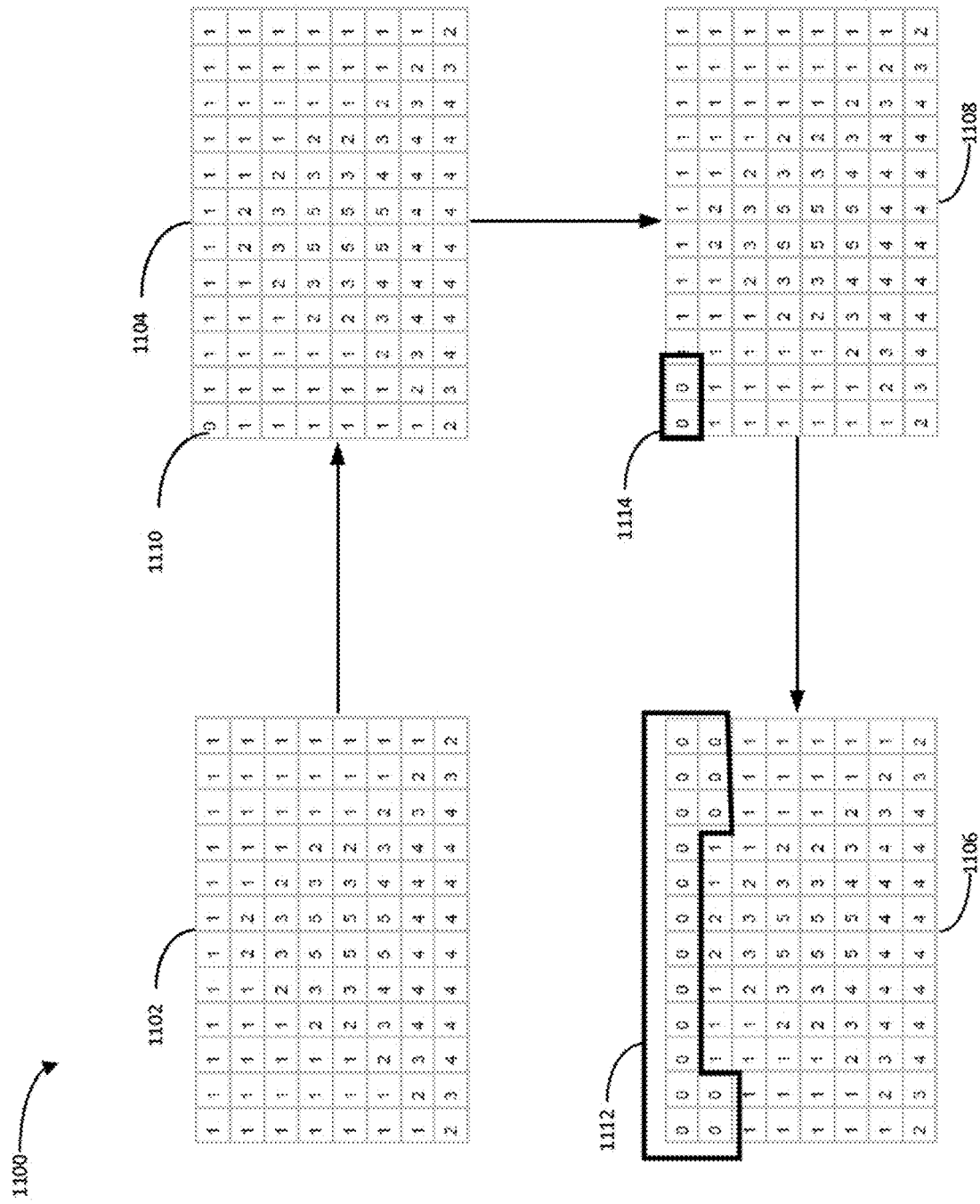
FIG. 11 illustrates an example of exclusion of elements from illumination adjustments, according to some embodiments.

In some embodiments, generating configuration instructions may further include determining a reference element for captured image data. For example, as illustrated by FIG. 11, process 1100 begins at step 1102, where initial configuration data may be collected. That data may be stored in a grid. Each element of the grid may correspond to an area of the image capture area. Subsequently, at block 1104, a reference element 1110 may be configured. Determination of the reference element 1110 may be made by an illumination controller (e.g., illumination controller 102 of FIG. 1). The determination may be made by using one or more thresholds. Additionally, or alternatively, reference element 1110 may be configured based on where the element falls within the grid (e.g., the top left corner). Additionally, or alternatively, reference element 1110 may be used to set an illumination threshold.

In some embodiments, the illumination threshold may be a brightness threshold. In other embodiments, the illumination threshold may be a dimness threshold. Illustratively, the illumination threshold can correspond to absolute threshold in which exceeding the threshold can result in a characterization of over-illumination. Referring to FIG. 5 at block 506, each element of the image data may be compared to this illumination threshold. If the illumination threshold is exceeded for time-based threshold, that element may be excluded from further adjustments to illumination. This may occur if an element is located in an area of the image where a reflective object is present (e.g., a wall). Additionally, or alternatively, a user may exclude elements from further adjustments. For example, in a non-limiting embodiment, a user may determine during that part of the image capture area contains information that is not of interest to them. The user may then provide instructions to exclude this area. This instruction may be provided to an illumination controller (e.g., illumination controller 102 of FIG. 1-3). Additionally, or alternatively, this instruction may be provided to an external device in communication with the illumination controller and/or the controllable illumination component.

In some embodiments, elements within the grid are set to zero when excluded from illumination adjustments. For example, at step 1108, elements 1114 are set to zero and, at step 1106, elements 1112 are set to zero. Exclusion from illumination adjustments may involve generation of instructions to not illuminate the sub-portions 120 associated with the excluded elements Additionally, or alternatively, exclusion from illumination adjustments may involve generation of instructions to illuminate sub-portions 120 associated with the excluded elements to a set level of illumination (e.g., a low level of illumination). Instructions may be generated by the illumination controller. Additionally, or alternatively, instructions may be generated by user input. Of course, a combination of sources for instructions is also possible. For example, in a non-limiting embodiment, instructions may be generated by the illumination controller to adjust illumination in a sub-portion. A user may later decide to exclude that sub-portion from illumination adjustments, provide corresponding instructions. (e.g., to the illumination controller, to a device in communication with the illumination controller, to the illumination device, etc.)

At block 406, additional image capture information may be obtained. Image capture information may be obtained continuously. Image capture information may include illumination data. Illumination data may include information relating to illumination levels of each sub-portion of an FOV of a camera. Referring to FIG. 5 at block 508, illumination data may also be obtained during one or more collection periods. Illumination data from past collection periods may be stored, such as in memory 308. Illumination data may be updated with recently obtained data, such as at block 510.

There may be intervals of time between the collection periods. Illumination may be updated during these intervals. Illumination may be on a scaled manner during these intervals. For example, in one non-limiting embodiment, it may be determined that a sub-portion at a high illumination level should be adjusted to a low illumination level. The illumination may be adjusted first to one or more medium levels before moving to a low level of illumination.

At block 408, the image capture information may be compared to one or more illumination thresholds. In some embodiments, illumination data may be extracted from image capture data and compared to one or more illumination thresholds. Referring to FIG. 5 at block 512, comparing illumination data to one or more thresholds may include verifying whether the illumination data for each element is outside the bounds of one or more thresholds. As discussed above, these thresholds could be at least brightness thresholds or dimness thresholds. Of course, other types of thresholds related to illumination may also be used. A brightness threshold may be exceeded if the element being compared is too bright. A dimness threshold may be exceeded if the element is too dim.

At block 410, the image capture information may be compared against one or more time-based thresholds. In some embodiments, illumination data may be extracted from image capture data and compared to one or more time-based thresholds. Each time-based threshold may be associated with an illumination threshold. For example, a time-based threshold may be exceeded if an illumination threshold has been exceeded for more than a set length of time. The set length of time may be longer than a collection period. Image capture information from past collection periods may be used to determine whether a time-based threshold has been exceeded.

Additional analysis may occur after a threshold has been exceeded. Additionally, or alternatively, additional analysis may occur if a group of thresholds are exceeded. Referring to FIG. 5 at block 513, further analysis may be conducted based on whether one or more thresholds are exceeded. For example, in a non-limiting embodiment, if an illumination threshold for an element is exceeded and a corresponding time-based threshold is exceeded, additional analysis may be conducted. However, in some embodiments, the additional analysis may be triggered by exceeding only one threshold, more than two thresholds, a set number of thresholds for more than one element (e.g., in one or more sub-portions), another arrangement of thresholds, or some combination thereof. Additionally, or alternatively, if illumination thresholds and/or time-based thresholds are exceeded for a group of elements (e.g., elements associated with the same sub-portion) additional analysis may be conducted. The additional analysis may relate to how to adjust the illumination attributes. For example, additional calculation may be performed to determine how to adjust the illumination attributes based at least in part on the degree to which a threshold (e.g., an illumination threshold, a time-based threshold, another threshold, some combination thereof) was exceeded.

Referring back to FIG. 4 at block 412, a determination may be made to update illumination attributes. Illumination attributes may be updated for at least two sub portions. Of course, in some embodiments, only one sub portion may be updated. At block 414, a determination may be made to forego updating illumination attributes. The determination on whether to update attributes may be made by the illumination controller. The determination may be based at least in part on comparison to the one or more thresholds. For example, referring to FIG. 5 at block 514 a determination is made on whether to update illumination attributes. This decision may be based at least in part on comparison to one or more thresholds. Additionally, or alternatively, the decision may be based at least in part on further analysis conducted after the comparison to one or more thresholds. In some embodiments, the decision on whether to conduct additional analysis may be based on the comparison to the one or more thresholds.

Updating illumination attributes may include generating instructions for an illumination device to update illumination in accordance with the determination. For example, referring to FIG. 5 at block 516 instructions may be transmitted to update the illumination parameters in accordance with the illumination attributes.

After block 412 or block 414, illumination data from the collection period may be transmitted to a memory (e.g., memory 308 of FIG. 3). Additionally, or alternatively, the method 400 may include returning to block 406 to obtain configuration data and repeating blocks 406-410. A different determination, for example, proceeding to block 414 instead of block 412 may be performed on each iteration of the loop. The loop from blocks 406-410, subsequently including either block 412 or 414, may occur during a collection period. In some embodiments, there may be an interval prior to restarting the loop to allow for scaled adjustment of illumination.

Figure 6:
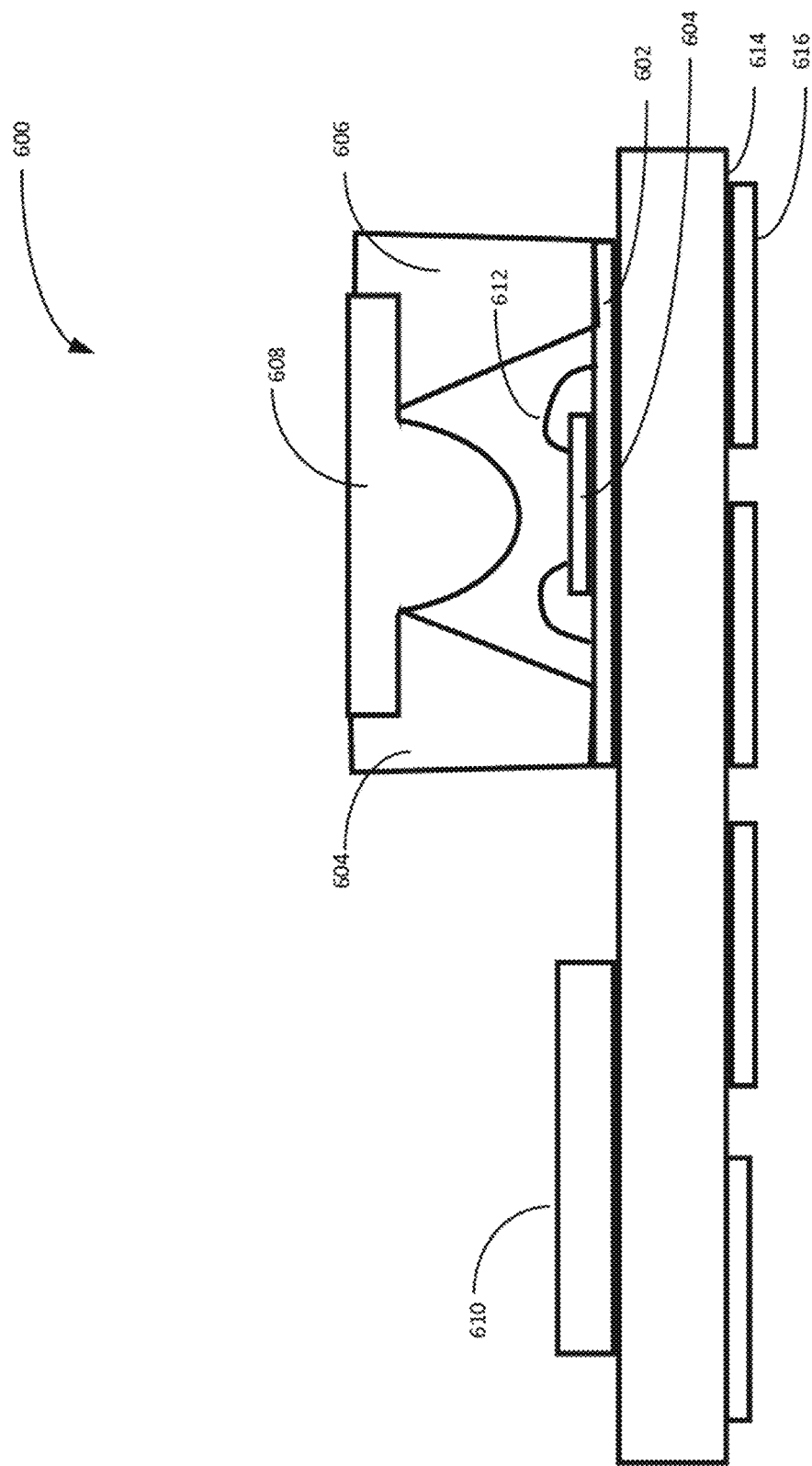
FIG. 6 illustrates an example embodiment of an illumination device.

Example Hardware Configurations for Adaptive Illumination using a VCSEL Array FIG. 6 illustrates an example embodiment of an illumination device (e.g., illumination device 104). FIG. 6 illustrates an assembly 600 of the illumination device. Assembly 600 may include a first substrate 602, an illumination chip 604, mounting brackets 606, lens 608, driver chip 610, second substrate 614 and solder pads 616. The dimensions of the assembly may be configured to allow the assembly to fit within a camera device, as described above.

Illumination chip 604 may include a VCSEL array divided into one or more individually controllable segments. Illumination chip 604 may be coupled to first substrate 602. Illumination chip 604 may be coupled to first substrate 602 by one or more solder bonds on the underside of the illumination chip 604 to one or more solder pads on first substrate 602. Additionally, or alternatively, illumination chip 604 may be coupled to first substrate 602 at least in part by wire bond. For example, wire bonds 612 could extend from illumination chip 604 and couple to first substrate 602 (e.g., to wire bond pads on first substrate 602).

Lens 608 may be configured to align with illumination chip 604. For example, in some embodiments lens 608 may be configured to couple to one or more mounting brackets 606. The one or more mounting brackets 606 may be configured to couple to first substrate 602 such that lens 608 aligns with illumination chip 604. In some embodiments lens 608 may align with a center of illumination chip 604. In some embodiments, the one or more one or more mounting brackets 606 may be configured to support the lens 608 at a distance from illumination chip 604 equal to or greater than the height of wire bonds 612. The height of wire bonds 612 may be configured to fit within the distance between the lens 608 and the illumination chip 604.

Additionally, or alternatively, lens 608 and illumination chip 604 may be configured such that light emitted from illumination chip 604 passes through lens 608. For example, in a non-limiting embodiment, illumination chip 604 may contain segments and each segment may contain one or more emitters. Light from each segment may be directed using lens 608. In some embodiments, other components of the assembly 600, such as one or more mounting brackets 606 may be used to direct light emitted from illumination chip 604. In some embodiments, light emitted from each segment of illumination chip 604 to one or more sub-portions (e.g., sub-portions 120 of FIG. 1). Light from each segment may be directed by to only one sub-portion. Of course, in some embodiments, light from each segment may be directed to more than one sub-portion or to part of a sub-portion.

First substrate 602 may be a flex PCB, a rigid PCB, a through-hole PCB, another type of PCB, or some combination thereof. In some embodiments, first substrate 602 may include, but is not limited to: ceramic materials, polyimide (PI), polytetrafluoroethylene (PTFE), or another substrate material. The material may be selected to allow the component to survive temperatures of approximately two hundred degrees Celsius during manufacture of the assembly 600. Additionally, the material for first substrate 602 may serve a function related to thermal management within the assembly 600. For example, illumination chip 604 may include a VCSEL array, and the emission of light by the VCSEL array may generate relatively high temperatures within the assembly. For example, in some embodiments, temperatures within the assembly may be one hundred degrees Celsius or greater. In a non-limiting embodiment, temperatures may reach one hundred and ten degrees Celsius. First substrate 602 may use a ceramic material to dissipate heat and/or facilitate assembly 600's continued function despite the high temperatures. Of course, assembly 600 may contain other components to facilitate high temperatures manufacture or thermal management within assembly 600. For example, lens 608 may include materials that can survive the high temperatures described above. In some embodiments, for example, lens 608 may include, but is not limited to quartz, calcium fluoride, germanium, or zinc selenide. In some embodiments, assembly 600 may be disposed within a camera device and work with additional components within the camera device for thermal management.

First substrate 602 may be configured to be coupled to another device. For example, first substrate 602 may be coupled to second substrate 614. In some embodiments, first substrate 602 may be coupled to second substrate 614 using soldering pads. Additionally, or alternatively, first substrate 602 may be coupled to second substrate 614 by wire bond. Driver chip 610 may also be coupled to second substrate 614. For example, in a non-limiting embodiment, driver chip 610 could be coupled to a left portion of second substrate 614 and first substrate 602 may be coupled to a right portion of second substrate 614.

In some embodiments, second substrate 614 may include a first and second surface. The first and second surface of second substrate 614 may be separated by a vertical distance corresponding to the thickness of second substrate 614. First substrate 602 may be coupled to second substrate 614 on a first surface of second substrate 614. One or more solder pads 616 may be coupled to the second surface second substrate 614.

In some embodiments, solder pads 616 may be used to couple second substrate 614 to another device. For example, in a non-limiting embodiment, second substrate 614 may be coupled to an image sensor. Additionally, or alternatively, second substrate 614 may be coupled to a third substrate, and the third substrate may have additional devices (image sensor, power source, etc.) and/or substrates coupled to it.

Figure 7:
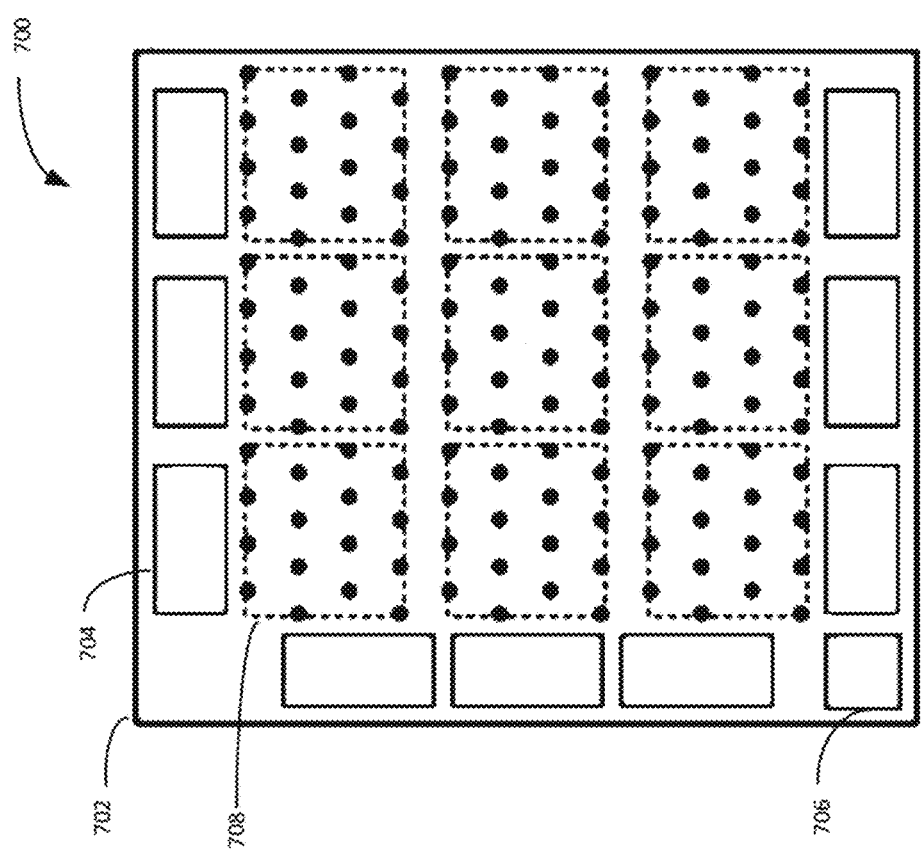
FIG. 7 illustrates an example embodiment of an arrangement of illumination units on a substrate.

FIG. 7 illustrates an example assembly 700 of an arrangement of illumination units on a substrate 702. The assembly 700 may be an illumination chip (e.g., illumination chip 604 of FIG. 6).

Elements 704 may be coupled to substrate 702. Elements 704 may be coupled to components external to assembly 700. For example, elements 704 may be connected to a battery. Additionally, or alternatively, elements 704 may be connected to controls (e.g., driver chip 610 of FIG. 6). In some embodiments, an element 706 may be coupled to substrate 702. In some embodiments, element 706 may be included in elements 704. Element 706 may include a chip identifier. The chip identifier may be used, for example, in obtaining status information relating to a particular chip.

Assembly 700 may include a VCSEL array. The VCSEL array may include one or more emitters. Each emitter may be individually controllable. Additionally, or alternatively, each of the one or more emitters may be associated with one or more segments 708. The one or more segments may be arranged into a matrix configuration.

For example, in some embodiments, there may be nine segments 708. In further embodiments, the nine segments 708 may be arranged in a 3×3 array. Of course, other configurations are also possible (e.g., 9×1, 1×9, etc.). In other embodiments, there may be six segments 708. In further embodiments, the six segments may be arranged in a 3×2 array. Of course, other configurations are also possible (e.g., 2×3, 6×1, 1×6, etc.). Other numbers of segments are also possible.

As discussed above, sub-portions for a field of view of a camera are defined by horizontal and/or vertical angular measurements. Each segment may correspond to illumination of a 50 degree horizontal and 50 degree vertical sub-portion for a field of view. In further embodiments, a 3×3 arrangement of segments may correspond to illumination of a 150 degree horizontal and 150 degree vertical field of view. However, the use of multiple segments may not correspond to illumination of a field of view with measurements that are the sum of the sub-portions that can be illuminated by each segment. For example, a 3×2 arrangement of segments may correspond to illumination of a 140 degree horizontal and 90 degree vertical field of view.

Each segment 708 may be individually controllable. For example, an independent driver channel can be assigned for each segment 708. Additionally, or alternatively, independent driver channels can be assigned to correspond with illumination of one or more independent sub-portions. For example, with reference to FIG. 6, generating instructions to adjust light emitted from illumination chip 604 can adjust illumination in that sub-portion. In a non-limiting embodiment, this may be done by generating instructions to adjust light emitted from segments of illumination chip 604 associated with that sub-portion. Additionally, or alternatively, illumination patterns may be set to adjust illumination as instructed by an illumination controller.

In accordance with one or more implementations, each element 704 is a control element associated with, and configured to control, a respective one or more segments, e.g. in one embodiment each element 704 is a control element associated with a respective one of the nine segments 708. In accordance with one or more implementations, a respective wire is bonded to each of the respective elements 704 to control an associated respective one or more segments, e.g. current provided via a wire connected to a respective element 704 effects or affects emission of light by emitters of the respective segment associated with that element 704. Light emission, e.g. an intensity of light emitted, may be controllable or impacted by an amount or level of current or voltage provided via a wire bonded or otherwise coupled or connected to the element 704.

In accordance with one or more implementations, a driver chip is utilized to control or drive emission of light by emitters of segments of a VCSEL array. The driver chip includes an input current line coupled to a power line, an input bus line coupled to a bus line, a security interlock line, and nine output lines, with each respective output line being coupled to a wire bonded or coupled to a respective corresponding element 704. Current provided by the driver chip over each respective output lines effects emission of light by emitters of the respective segment corresponding to that output line. Each respective output line can be characterized as being associated with a respective channel corresponding to that respective output line and the corresponding respective segment.

In accordance with one or more implementations, nine segments are utilized, and each channel or segment is associated with a 10 microsecond channel slot. In accordance with one or more implementations, pulse width modulation is used for each respective 10 microsecond channel slot, with a duty cycle between 0.2% and 100% controlling emission of light by emitters of the corresponding respective segment. In accordance with one or more implementations, for each channel, 512 possible levels are provided between 18 nanoseconds and 9.216 nanoseconds. In accordance with one or more implementations, there is a 10 microsecond slot for each of nine channels, resulting in a total 90 microsecond cycle and a frequency of 1/90 microseconds=11.1 kHz. In accordance with one or more implementations, current from the input current line is switched between each of the output lines based on a current channel slot, e.g. current is switched from one output line to a next output line every 10 microseconds based on 10 microsecond channel slots.

In accordance with one or more implementations, the input bus line provides a nine bit value that indicates 512 possible levels, with the first bit corresponding to an 18 nanosecond pulse for a channel, and the ninth bit corresponding to a 9,216 nanosecond pulse for the channel. The input bus line can provide an analog or digital input. The input bus line can, for example, provide analog or digital input for 10 microsecond periods each representing input for a single channel.

In accordance with one or more implementations, a continuous current line (e.g. 4 volts, 160 microamps) is switched between nine output lines with input received over the input bus line being used to program each channel for 0-100% duty cycle during a 10 microsecond channel slot at one of 512 levels determined based on 9 bit input for that channel slot.

In some embodiments, the emitters may be vertical-cavity surface-emitting lasers (VCSELs). In further embodiments, the emitters may have a narrow frequency/wavelength band. For example, the lasers may have a wavelength band of <5 nm, e.g. at around 850 nanometers. In some embodiments, the emitters may be configured to facilitate use of an RGB-IR camera device. For example, in a non-limiting embodiment, a camera device comprising an RGB-IR camera may include a dual band IR filter with a narrow notch (e.g. corresponding to around an 850 nanometer wavelength in air) to cut off frequencies associated with solar radiation during the day while allowing emission of an allowed band of IR frequencies at night. The narrow wavelength band of the lasers may facilitate emissions within a desired band of IR frequencies while mitigating loss resulting from emissions outside the allowed band. This may obviate the need for an IR cut filter, reduce power usage by the camera device, and extend battery life if the camera device uses a battery or batteries.

FIG. 8A-B illustrate an example embodiment of an illumination device) where an optical element is aligned over the center of an array of illumination units. Each illumination unit may be a segment of an illumination chip (e.g., illumination chip 604 of FIG. 6). FIG. 8A depicts a cross-sectional view of an assembly 800. Assembly 800 may form part of the assembly 600 depicted in FIG. 6. For example, assembly 800 may contain first substrate 602, illumination chip 604, and lens 608.

Assembly 800 may contain pads 802, 804, 806, 810, and 812. Assembly 800 may also include vias 814, 816, and 818. Illumination chip 604 and pads 808 and 810 may be coupled to a first surface of first substrate 602. pads 802, 804, and 806 may be coupled to a second surface of first substrate 602. Pad 802 may be coupled to pad 808 through via 814. Pad 804 may be coupled to illumination chip 604 using via 816. Pad 806 may be coupled with Pad 810 using via 818. Illumination chip 604 may be connected to pads 808 and

810. For example, illumination chip 604 may be connected to pads 808 and 810 using at least two wire bonds (e.g., wire bonds 612 of FIG. 6).

Materials for substrate 602 could include, but are not limited to ceramic materials, polyimide (PI), or polytetrafluoroethylene (PTFE). As discussed above, in some embodiments, a ceramic material may be chosen to survive high temperatures and/or to facilitate heat dissipation, as discussed above with reference to FIG. 6. Assembly 800 may have a dimension 820 equal to the thickness of first substrate 602 plus the thickness of at least one of pad 808, illumination chip 604, or pad 810. In some embodiments pad 808, illumination chip 604, and pads 810 may have the same thickness. This thickness may be between 0.05 mm and 1.5 mm. In a non-limiting embodiment, the thickness may be 0.1 mm.

Lens 608 may be separated from first substrate 602 by a dimension 822. Wire bonds connecting illumination chip 604 to first substrate 602 (e.g., wire bonds 612 of FIG. 6) may be configured to fit within dimension 822. For example, in some embodiments, dimension 822 may be approximately 0.246 mm. Additionally, or alternatively, dimension 822 may be configured to facilitation direction of light emitted from illumination chip 604. For example, dimension 822 may be configured such that light from each segment of illumination chip 604 travels through lens 608 such that lens 608 refracts the light to at least one intended sub-portion (e.g., sub-portions 120 of FIG. 1).

Other components of assembly 600 or assembly 800 may be configured to facilitate direction of light from illumination chip 604 to at least one sub-portion of a camera's field of view. For example, in some embodiments, lens 608 may be coupled to first substrate 602 using one or more mounting brackets (e.g., one or more mounting brackets 606 of FIG. 6). In a non-limiting embodiment, one mounting bracket may be used. For example, the mounting bracket may contain a central hole configured to receive the lens 608. In some embodiments, one or more mounting brackets 606 may be configured to absorb light emitted by illumination chip 604 and/or light directed by lens 608. This absorption may reduce light reaching a camera's field of view that is not directed to at least one intended sub-portion.

In some embodiments lens 608 may be coupled to mounting brackets using adhesive. Additionally, or alternatively the one or more mounting brackets 606 may be coupled to first substrate 602 using adhesive. In some embodiments, subsequent to this step, the assembly, including at least the first substrate 602, one or more mounting brackets 606, and lens 608 may be sealed. Additionally, or alternatively, the assembly may become sealed through being coupled together with adhesive.

Lens 608 may include a first portion 824 and second portion 826. First portion 824 and second portion 826 may be coupled together to form a single lens body. First portion 824 and second portion 826 may be manufactured separately. Additionally, or alternatively, they may be manufactured together. For example, a mold may be manufactured for lens 608, and plastic may be poured into that mold to form the entirety of lens 608. Of course, other manufacturing methods for lens 608 are also possible.

First portion 824 may have a conical profile. First portion 824 may have a height of dimension 828. Dimension 828 may be approximately 1.87 mm. Additionally, or alternatively, first portion may have a base with a diameter of dimension 830. Dimension 830 may be approximately 1.92 mm. Second portion 826 may have a height of dimension 832. Dimension 832 may be approximately 1.05 mm. Additionally, or alternatively, second portion 826 have a base with a diameter of dimension 834. Dimension 834 may be approximately 3.8 mm. In some embodiments, the dimensions of lens 608 may be configured to facilitate direction of light from illumination chip 604 to at least one intended sub-portion. For example, the diameters of the base of the first portion and the base of the second portion may be configured to be larger than the width of an illumination chip 604.

Lens 608 may be made of a material that functions well at high temperatures, as discussed above. Additionally, or alternatively, lens 608 may be made of a high index plastic material, such as ULTEM1010. Of course, lens 608 be made of, but is not limited to, glass, acrylic, polycarbonate, quartz, calcium fluoride, germanium, or zinc selenide. The material may be selected such that light refracted through lens 608 reaches an intended sub-portion. In addition, lens 608 may include an outer surface.

The outer surface may have a diffusive surface in order to improve uniformity in light directed through lens 608. For example, an outer surface of lens 608 may have a diffusive finish in order to soften bright spots and eliminate speckles. In one embodiment, the finish may correspond to a specification of mold texture, such as specified in the Verein Deutscher Ingenieure (VDI) specifications. Other types of finishes or finish standards may also be applied.

The diffusiveness of the outer surface may differ in different portions of the outer surface to facilitate diffusion of light directed through lens 608. Illustratively, differences in diffusiveness may be achieved based on selective application of finishes to the outer surface of the lens. For example, in some embodiments, a part of the outer surface may have a VDI finish, and another part may not have a VDI finish. For example, a part of the outer surface corresponding to first portion 824 may have a VDI finish, while a part of the outer surface corresponding to second portion 826 may not have a VDI finish (or some other finish with different properties). In another embodiment, the conical surface corresponding to the first portion 824 may have a VDI finish, the base of the second portion 826 with a diameter of dimension 834 may have a VDI finish, and the remainder of the outer surface may not have a VDI finish or have a different VDI finish. Additionally, or alternately, the part of the outer surface corresponding to the first portion 824 may have a first finish, and the part of the outer surface corresponding to the base of second portion 826 may have a second finish.

Additionally, or alternatively, parts of the base of second portion 826 may have a VDI finish. For example, in a non-limiting embodiment, the part of the outer surface corresponding to the first portion 824 may have a first finish, a first circle with centered within the base of the second portion may have a second finish, and the remainder of the base of the second portion may have a third finish. In a non-limiting embodiment, the first circle may have a radius of between 0mm and 1 mm. In a non-limiting embodiment, the first finish may correspond to VDI-28, the second finish may correspond to VDI-17, and the third finish may correspond to VDI-00. VDI-28 may correspond to a randomized roughness of 2.5 micrometers, and VDI-17 may correspond to a randomized roughness of 0.7 micrometers, and VDI-00 may correspond to a surface roughness of less than 0.1 micrometers. Of course, in some embodiments the entirety of the outer surface may have the same finish or may not have a diffusive finish.

With reference to FIG. 8B, lens 608 may be aligned over a segment of illumination chip 604. For example, lens 608 may be aligned over a center 852 of illumination chip 604. Additionally, or alternatively, lens 608 may be aligned to take advantage of attributes of light emitted from illumination chip 604. For example, in a non-limiting embodiment, illumination chip 604 may include a VCSEL array. An assembly including lens 608 and illumination chip 604 may be designed to take advantage of the telecentric properties of beams emitted from the array to obtain a desired field of view. For example, as discussed above, the lens may refract beams from segment to an intended sub-portion. The field of view illuminated by this assembly may be 150 degrees horizontal by 150 degrees vertical.

Figure 9:
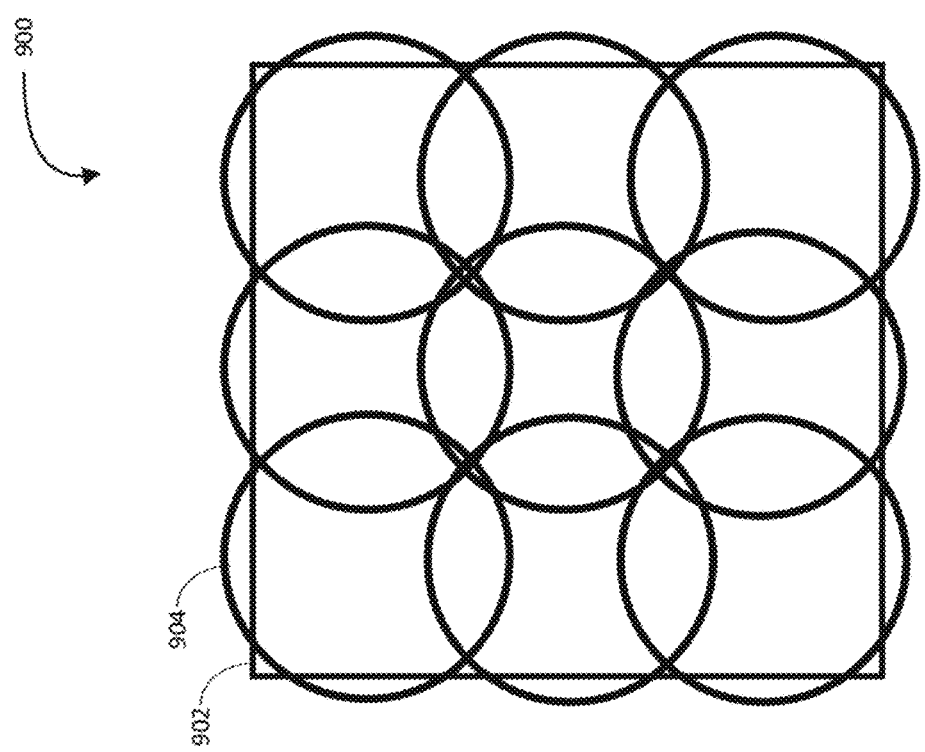
FIG. 9 illustrates an example embodiment of an illuminated areas generated by an illumination device.

FIG. 9 illustrates an example embodiment of an illuminated areas generated by an illumination device. With reference to the illustrative example of FIG. 9, an illuminated environment 900 may contain a field of view 902. In some embodiments field of view 902 may be a circle, square, another shape, or some combination thereof. Field of view 902 may be illuminated from light emitted from an illumination chip (e.g., illumination chip 604 of FIG. 6). As discussed above the illumination chip may include segments (e.g., segment 708 of FIG. 7) containing one or more emitters.

Light emitted from each segment may form individual illuminated areas, such as illuminated area 904. The individual illuminated areas may be circles, squares, another shape, or some combination thereof. These individual illuminated areas 904 may form one or more illumination patterns within field of view 902. In some embodiments, each possible illumination pattern may represent a sub-portion (e.g., sub-portions 120 of FIG. 1). Additionally, or alternatively, each segment may represent a sub-portion (e.g., sub-portions 120 of FIG. 1).

Figure 10:
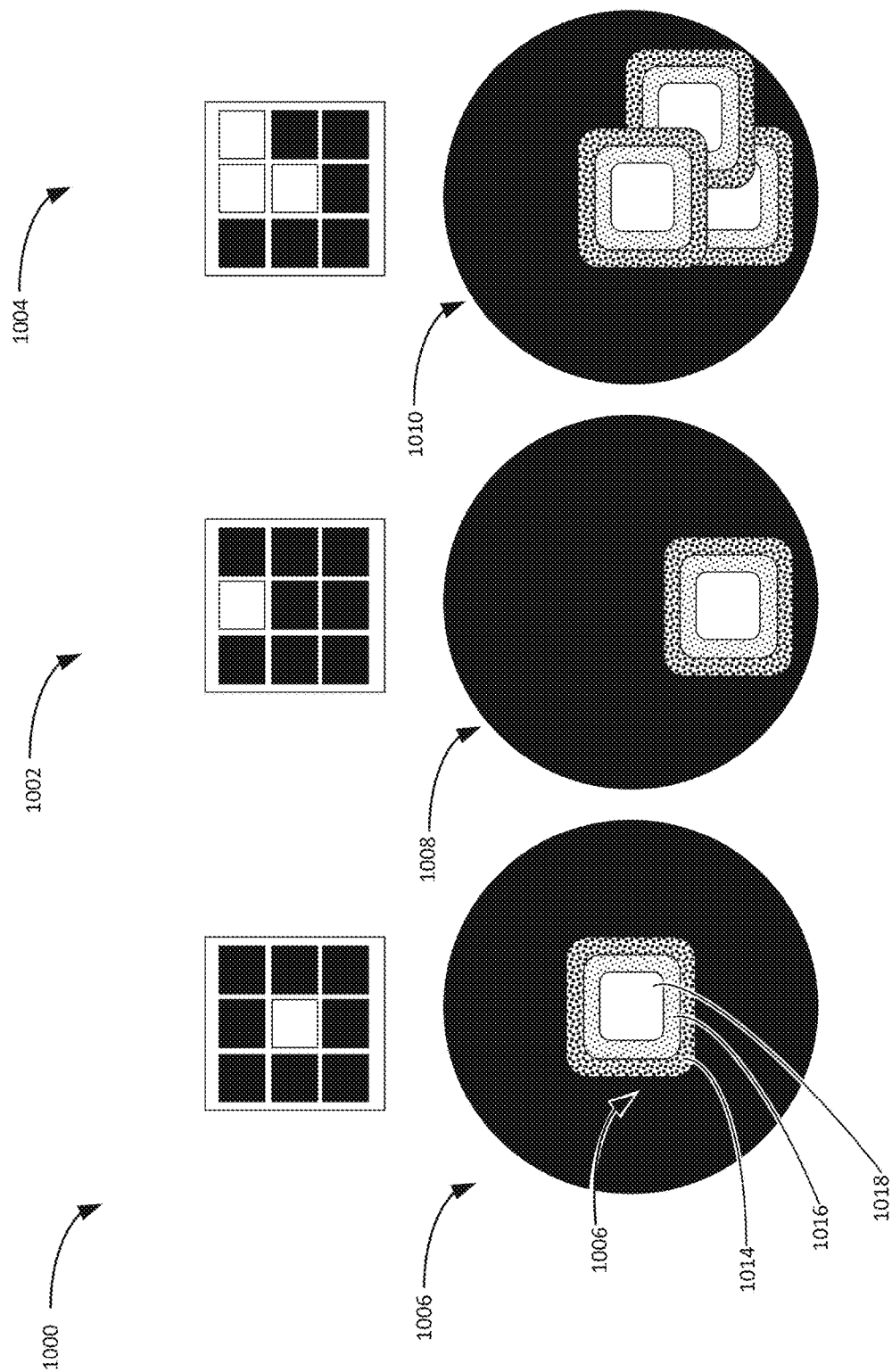
FIG. 10 illustrates example embodiments of illumination patterns generated by an illumination device.

The controls described above may facilitate generation of multiple illumination patterns by engaging different segments. For example, controls may be provided for six segments, nine segments, or another number of segments. FIG. 10 illustrates illumination patterns that can be generated using nine segments (e.g., segment 708 of FIG. 7). As discussed above, each segment may contain one or more emitters. Each segment may be in an activated state or a deactivated state. Additionally, or alternatively, a subset of emitters in each segment may be in an activated or de-activated state.

Activated states are represented by a white square and deactivated states may be represented by a dark square. Activated segments may be segments that are configured to emit light. In some embodiments, activated segments may be configured to emit light at a maximum intensity. Additionally, activated segments may be configured to emit light at a minimum intensity or one or more intermediate intensities. Activation states may be set using the controls described above.

Arrays with segments in different activated states may generate different illumination patterns. For example, array 1000 may have a central segment illuminated. This may result in an illuminated area 904 in a central area of illumination pattern 1002. This may result in illumination being increased to only a central sub-portion. In controls, array 1004 may have a top segment illuminated, resulting in an illuminated area in lower area of illumination pattern 1006. This may result in illumination being increased to only a lower sub-portion.

In some embodiments, light emitted from each segment may overlap to form illumination patterns. For example, array 1008 may have central, top, and top-right segments illuminated. This may result in illumination pattern 1010 formed by overlapping light emitted from these segments. The resulting illuminated area may be in a central, lower, and lower-right area of illumination pattern 1010. This may result in illumination being increased to the corresponding sub-portion(s).

In further embodiments, light emitted from some segments 708 may overlap while light emitted from other segments 708 may not overlap. In other words, light may be emitted to different sub-portions which do not overlap with each other (e.g., left and right). In some embodiments, there may be no overlap between light emitted from activated segment(s). This may occur when one segment is activated, when segments opposite from each other are activated (e.g., left and right, top and bottom, diagonals, other configurations that do not result in overlap, or some combination thereof).

The light emitted by each segment may vary in brightness. This may be reflected in their corresponding illuminated area. In illumination pattern 1002, for example, illuminated area 904 may have a low brightness portion 1014, a medium brightness portion 1016, and a high brightness portion 1018. In some embodiments, light emitted from the segment(s) may have uniform brightness. This uniform brightness level may be achieved through optical elements placed in front of the segment(s). For example, an optical element (e.g., lens 608 of FIG. 6), can be placed in front of one or more segment(s) to diffuse the light before it reaches an illumination area such that the brightness at the illumination area associated with the segment(s) is uniform.

Example Adaptive Illumination Process

In accordance with one or more preferred implementations, a sensor image is split into zones, and image signal processor (ISP) automatic exposure (AE) statistics are utilized to determine a current luminance value for each zone. Taking one zone as an example, one or more segments associated with that zone are then adjusted to bring the luminance for the zone to the automatic exposure control's (AEC's) Y target, and/or to bring the AEC sensor gain down below a tuned threshold.

In accordance with one or more preferred implementations, a process function is called or executed at a periodic interval, e.g., 500 milliseconds or 333 milliseconds, or at a set rate, e.g., 2 Hz or 3 Hz. In accordance with one or more preferred implementations, such a process function is called or executed more often during initial convergence.

As part of this process function, a statistics grid from an image signal processor of the camera device is retrieved. In accordance with one or more preferred implementations, this grid is decimated to a smaller grid, e.g., an 8×8 grid. In accordance with one or more preferred implementations, ISP statistics are polled at a rate of 3 Hz.

In accordance with one or more preferred implementations, each intended zone for a camera device represents a channel, and an additional channel is defined for all of the zones, e.g., a device with a left zone, a center zone, and a right zone might have a left channel, a right channel, a center channel, and an all channel. For each channel, a weighted average is applied to calculate a set of Y estimates. The Y estimates are combined in a matrix multiply operation to calculate a signal for each channel, e.g., an all channel signal, a left channel signal, a center channel signal, and a right channel signal. Each of the channel signals is fed to a control loop which calculates a new segment target current value for each segment (e.g., segment of a VCSEL array) in the subject channel.

In accordance with one or more preferred implementations, each channel implements a control loop via common callback to the same function or algorithm. In accordance with one or more preferred implementations, such a function or algorithm takes as input an AEC Y target value, an AEC output sensor gain value, a channel Y-estimate value, and a gain target threshold.

In accordance with one or more preferred implementations, the AEC Y target value is a linear fraction of white and the current AEC setpoint. In accordance with one or more preferred implementations, the automatic exposure control will adjust the sensor to pull global Y to this value. In accordance with one or more preferred implementations, this value varies slowly with time and is lower in darker scenes.

In accordance with one or more preferred implementations, the AEC output sensor gain value is the linear analog gain being sent to the sensor. In accordance with one or more preferred implementations, this value is a proxy for noise in an image. In accordance with one or more preferred implementations, if this value is high, noise should be reduced by increasing the signal by increasing current to the corresponding one or more segments for that channel. If this value is low, current to the corresponding one or more segments for that channel can be reduced.

In accordance with one or more preferred implementations, a zone Y estimate is a linear fraction of white, and a gain target threshold is a linear analog gain value which has acceptable noise and is in a "dark" regime.

In accordance with one or more preferred implementations, a function or algorithm calculates an ideal gain for segment brightness based on a linear combination of the inputs.

In accordance with one or more preferred implementations, a proportion of the ideal gain is then applied to a current segment current value to determine a new target current value for that segment.

As a first example, a delta value can be calculated as delta=(y*gain_threshold)/(y_target* gain), and a new target current value for a segment new_segment can be determined based on the delta and a previously current segment current value old_segment, e.g., new_segment=pid (delta, old_segment). This determined target current value can then be used to change the amount of current being supplied to the segment, thus changing the illumination of the scene.

As a second example, at a rate of 3 Hz, individual zone Y values are determined as well as a current AEC Y target value and a current camera analog gain value. A tunable target gain threshold value (e.g., corresponding to a minimum amount of noise that is tolerable for an image) that has been selected or tuned is utilized as well. For each channel or zone, a first value A is calculated by dividing the current Y value for that zone by the current AEC Y target value, and a second value B is calculated by dividing the current camera analog gain value by the tunable target gain threshold value. An error value for a channel or zone is determined based on dividing B by A. A proportional control can be applied to increase the current supplied to the corresponding one or more segments for that channel or zone until B=A (or is within a threshold amount to it or B/A or A/B is within a threshold distance to 1). In accordance with one or more preferred implementations, this adjusts the one or more segments for a zone or channel until images are correctly exposed with a sensible noise value.

In accordance with one or more preferred implementations, a camera device utilizes a signal or data from an ambient light sensor (e.g., a lux signal) to determine whether to switch into or out of a night vision mode. In the night vision mode, IR light sources (e.g., VCSEL emitters) are enabled, while in day mode IR light sources are disabled. In implementations using a VCSEL array the day night transition may be made based on the amount of useable signal received by the camera device. For example, if useable signal in visible light frequencies falls below a threshold, the camera device may transition into night mode. In accordance with one or more preferred implementations, enabling/disabling or activation/deactivation of visible light sources is or can be decoupled from that of IR light sources.

Example Hardware Implementations in a Camera Device

In accordance with one or more preferred implementations, approaches disclosed herein are implemented in a camera device such as a security camera device or a video doorbell device. In some instances, the device may include a housing and a base plate that couples to the housing for disposing the device on a surface (e.g., wall). The housing may include various computing components, such as an imaging sensor (e.g., camera), light emitting elements (e.g., light emitting diodes (LEDs)), RADAR sensor, passive infrared (PIR) sensor(s), microphone(s), and so forth for detecting motion, recording audio and/or video, and so forth within an environment of the device, respectively. A button, for example, may receive touch input for controlling one or more operations of the device. For example, in response to detecting a press of the button, the imaging sensor may be capturing image/video data. In addition, the housing may include one or more speaker(s) (e.g., mid-range speaker, tweeter speaker, subwoofer speaker) for outputting sound within the environment. The housing may house a battery of the device, which may connect to computing components of the device via a waterproof connector.

The device may include a front, a back, a top, a bottom, and adjacent lateral sides. In some instances, the imaging sensor, the PIR sensor(s), and/or the RADAR sensor are oriented towards the front and/or sides of the device. In some instances, the PIR sensor(s) and the RADAR sensor may be located closer to the top of the device than the imaging sensor. Additionally, the RADAR sensor may be located between the PIR sensor(s). In some instances, the PIR sensor(s) and the RADAR sensor are horizontally aligned, and/or the RADAR sensor and the imaging sensor may be vertically aligned.

The imaging sensor, the PIR sensor(s), and/or the RADAR sensor may serve to detect motion within an environment of the device. For example, image processing on image/video data captured by the imaging sensor may be used to detect persons (or other objects of interest). The PIR sensor(s) may detect or receive mid-IR light emitted by persons (e.g., according to a temperature of the person). The RADAR sensor, meanwhile, may be used to determine polar coordinates (or a position) of persons. In some instances, the RADAR sensor may enable the device to focus on object detection and capabilities to operate in low power modes. In some instances, the imaging sensor, the PIR sensor(s), and/or the RADAR sensor may be used in combination to detect persons, and in response, capture video and/or audio data. For example, upon mid-IR (e.g., motion) being detected via the PIR sensor(s), the imaging sensor may begin recording image/video data. In addition, the imaging sensor may begin recording image/video data in response to a press of the button. In some instances, the imaging sensor, the PIR sensor(s), and/or the RADAR sensor enable the device with 3D motion detection.

The button may be located vertically beneath the imaging sensor. In some instances, the button is located closer to the bottom of the device than the imaging sensor, the RADAR sensor, and/or the PIR sensors. In some instances, the button is vertically aligned with the RADAR sensor and/or the imaging sensor. A light ring, for example, may at least partially surround the button and illuminate according to certain appearance states. In some instances, the light may be output through the light ring in response to motion being detected, a press of the button, and so forth.

The device may include various lighting elements for illuminating the environment, illuminating the light ring, and for enabling the camera(s) to capture image/video data and/or motion detection. For example, the lighting elements may be disposed beneath the light ring. The lighting elements may also include infrared (IR) lighting elements to enable the imaging sensor to capture image/video data in low-light conditions (e.g., nighttime). In some instances, the IR lighting elements may output IR light in front of, and/or to the sides of, the device. In some instances, first IR lighting elements may be disposed to a first side of the imaging sensor, while second IR lighting elements may be disposed to a second side of the imaging sensor. In some instances, the IR lighting elements are located closer to the top of the device than the bottom. Additionally, in some instances, the IR lighting elements may be horizontally aligned on the device.

The device may include a frame that orients the PIR sensor(s) towards the sides, the top, and/or the front of the device. The PIR sensor(s) and the frame may couple to the housing. In some instances, the frame includes two cavities for receiving two PIR sensors. In some instances, the device includes mirrors coupled to the frame, and where the PIR sensors are oriented towards the mirrors, respectively. For example, the mirrors may be configured to reflect light in a direction towards the PIR sensors, respectively. The mirrors may increase a field of view of the PIR sensor(s). In instances in which the device includes two mirrors, a first of the PIR sensors may be oriented towards a first mirror, vice versa, and a second of the PIR sensors may be oriented towards a second mirror, vice versa.

In some instances, the imaging sensor, the RADAR sensor, one of the first IR lighting elements, and one of the second IR lighting elements are oriented in a first direction (e.g., towards the front). In some instances, another of the first IR lighting elements is oriented in a second direction (e.g., towards the front/first side), and another of the second IR lighting elements is oriented in a third direction (e.g., towards the front/second side). In some instances, the first PIR sensor is oriented in a fourth direction and the second PIR sensor is oriented in a fifth direction.

The device may include microphone(s) for capturing audio within the environment. In some instances, the microphone(s) are arranged on or across the front of the device. In some instances, the microphone(s) may be located between the imaging sensor and the top of the device. In some instances, the microphone(s) may be located closer to the top of the device than the imaging sensor. In some instances, the microphones are located vertically beneath the PIR sensor(s) and the RADAR sensors. As such, in some instances, the PIR sensor(s) and/or the RADAR sensor may be located closer to the top of the device than the microphone(s). In some instances, the microphone(s) may include at least two microphones for noise cancellation, directionality, and so forth. In some instances, a first of the microphones represents an external microphone for capturing audio external to the device, while a second microphone may represent an internal microphone for capturing audio interior to the device. The microphone(s) may be oriented in the first direction (e.g., towards the front).

In some instances, the device may include a status indicator (e.g., RGB LED) located on the front of the device that indicates an operational status of the device. For example, the status indicator may indicate whether the microphone(s) are recording audio, whether the camera(s) are capturing video, and so forth. The device may also include an ambient light sensor that is used to transition the device to night mode (e.g., low light conditions). The ambient light sensor may be located between the imaging sensor and the button. In some instances, the lighting elements and the light ring disposed about the button may represent the status indicator.

In some instances, one or more printed circuit boards (PCBs), printed circuit board assemblies (PCBAs), and/or flexible printed circuits (FPCs) are disposed within the housing. In some instances, a first PCB may include the RADAR sensor, a second PCB may include the connector for connecting to a battery of device, and a third PCB may include the PIR sensors and/or the imaging sensor. The third PCB may additionally include network interfaces (e.g., antenna(s)) for wirelessly coupling the device to one or more remote devices (e.g., mobile device, laptop, etc.) over one or more networks (e.g., Cellular, Wi-Fi, BLE, Bluetooth, etc.). In some instances, the third PCB may be disposed between the first PCB, which is located more proximate to the front of the device, and the second PCB, which is located more proximate to the back of the device. Additionally, a first FPC may include the microphone(s), the IR lighting elements, and/or the ambient light sensor, while a second FPC may include the button and the lighting elements for illuminating the light ring. The PCBAs, the PCBs, and the FPCs, as well as other computing components of the device, may be communicatively coupled to one another via one or more flex circuits, wires, connectors, and so forth.

The device may include one or more covers, windows, and/or lenses disposed over the imaging sensor, the PIR sensor(s), the RADAR sensor, the lighting elements, etc. For example, a first cover may be disposed over the PIR sensors and the RADAR sensor, a second cover may be disposed over speakers of the device, and/or define an aperture through which the button is accessible and the lighting elements emit light, a third cover may be disposed over the first IR lighting elements disposed to the first side of the imaging sensor, and a fourth cover may be disposed over the second IR lighting elements disposed to the second side of the imaging sensor. A lens may be disposed over the imaging sensor and/or the ambient light sensor. In some instances, the covers, windows, and/or lenses may couple to the housing, at the front and/or along the sides of the device. Additionally, the covers, windows, and/or lenses may include a material that is transparent or translucent to permit the PIR sensor(s) to detect motion and the imaging sensors to record video, for example. Example materials may include glass and polycarbonate. The windows and/or lenses may also reduce glare (e.g., anti-glare coatings) to increase a quality of videos being captured.

The housing defines various receptacles for receiving the PCBs, PCBAs, FPCs, sensor(s), and so forth. In addition, the housing may define a receptacle for receiving the battery. Various receptacles of the housing also accommodate the imaging sensor, the IR lighting elements, the PIR sensor(s), and so forth. Additionally, in some instances, the device includes a frame that supports the first FPC and/or the PIR sensor(s). The frame, for example, may orient the PIR sensor(s) within the environment. The housing and the frame may also include various alignment mechanisms, such as tabs, pins, slits, and so forth for aligning components within the device. For example, prongs extending from the housing and/or the frame may be disposed through openings on the PCBAs, the PCBs, and the FPCs for aligning the PCBAs, the PCBs, and the FPCs within the device).

The device includes the speakers for outputting sound into the environment. In some instances, the speakers are arranged to output sound towards the sides of the device. For example, a first speaker may be oriented towards a first side of the device, while a second speaker may be oriented towards a second side of the device. The second cover may include orifices for permitting sound to travel from the speakers to an exterior of the device. In some instances, a speaker grill and/or other membranes are disposed over the speaker.

The device includes the battery connector for connecting the battery to the second PCB, for example. In some instances, the battery connector is disposed between the connector of the second PCB and contacts of the battery. The connector of the second PCB, for example, may include pins that engage with prongs of the battery connector. The prongs additionally engage with the contacts of the battery such that power may be routed from the battery to the second PCB, and onto the rest of the device. In some instances, the battery connector includes a body, where the prongs are disposed through the body, and a seal that is disposed at least partially around the body. The pins of the connector may be biased into contact with the prongs of the battery connector, such as a first end thereof, while a second end of the prongs may include a curvature (e.g., bend, etc.) that provides a biasing force to the second end to maintain contact with the battery (i.e., with the contacts).

In some instances, the battery connector is designed to protect components of the device from water damage. For example, the seal, which may include ribs that engage within a receptacle (e.g., slot, passage, etc.) of the housing, may prevent the ingress of liquid into the device. The battery connector, such as the prongs engaging with the contacts of the battery and the pins, permits a quick-release or ease of connecting and disconnecting the battery.

In some instances, heat dissipating elements are included to disperse heat generated by components of the device. By way of example and not limitation, the imaging sensor, lighting elements, power supply, network interfaces, and so forth generate heat during use. Without effectively dispersing or dissipating this heat, the internal components, such as the imaging sensor, may be adversely affected and become uncappable of performing its intended function. To efficiently dissipate heat generated by the components, heat dissipating elements may be included to transfer heat away from generating sources toward an exterior of the device, and/or to uniformly distribute the heat over the surface area of the device.

In some instances, the device may include a setup button located within the second cover. For example, removing the second cover may expose the setup button. For example, as part of an out of box experience (OOBE), the setup button may be pressed to setup the device. The device may additionally include buttons that correspond to a mute button, a synchronization button, a reset button, a volume button, and so forth. Components of the device may be manufactured using any suitable manufacturing technique, such as blow molding, injection molding, stamping, and so forth. Additionally, suitable materials include metals, composites, plastics, and/or any combination thereof.

Figure 12:
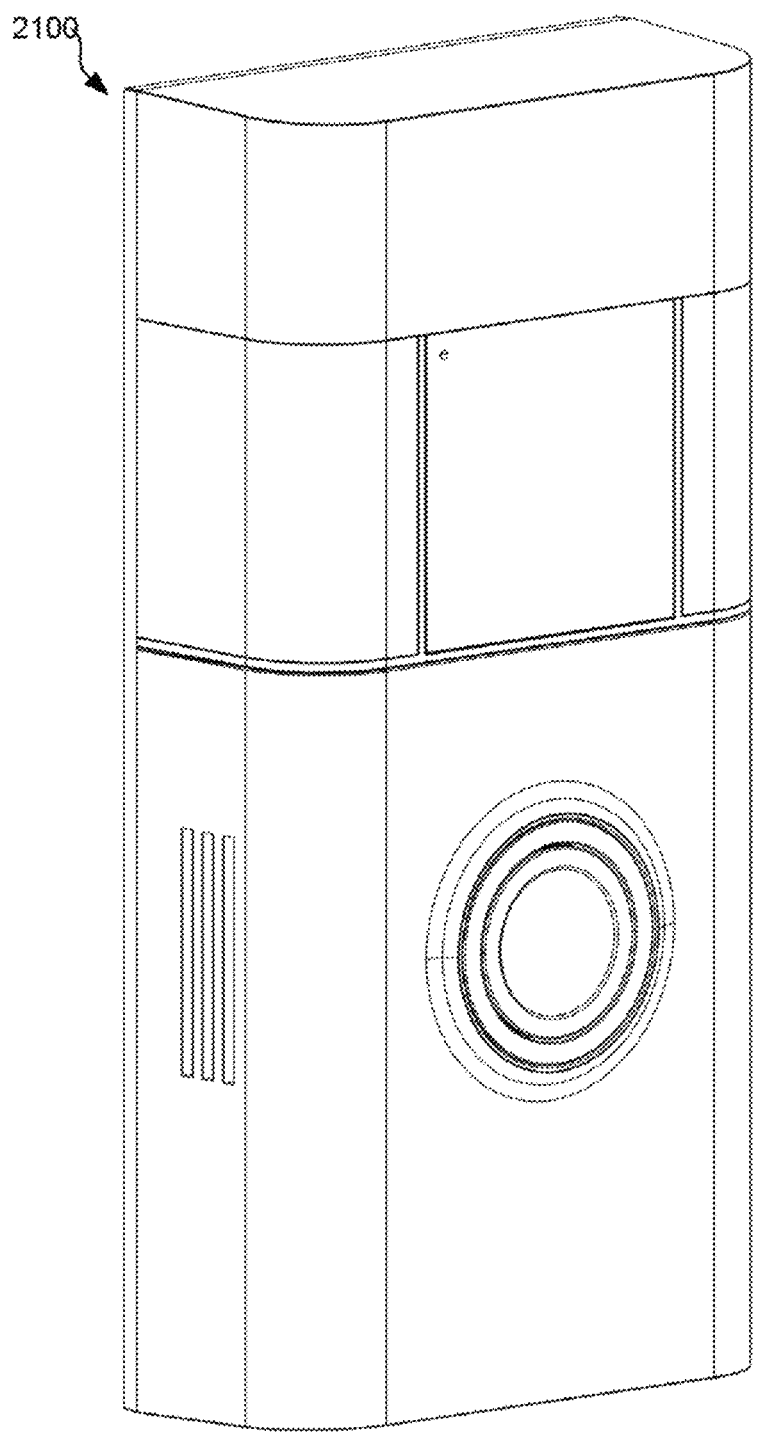
FIGS. 12-15 illustrate a camera device in accordance with one or more preferred implementations.

FIG. 12 illustrates a video doorbell device 2100 in accordance with one or more preferred implementations. The device 2100 includes a front, a back spaced apart from the front (e.g., in the Z-direction), a top 2106, a bottom 2108 spaced apart from the top 2106 (e.g., in the Y-direction), and adjacent lateral sides, such as a first side 2110 and a second side 2112 spaced apart from the first side 2110 (e.g., in the X-direction). In some instances, the device 2100 may include a base plate for disposing the device 2100 along one or more surfaces, such as a wall.

Figure 13:
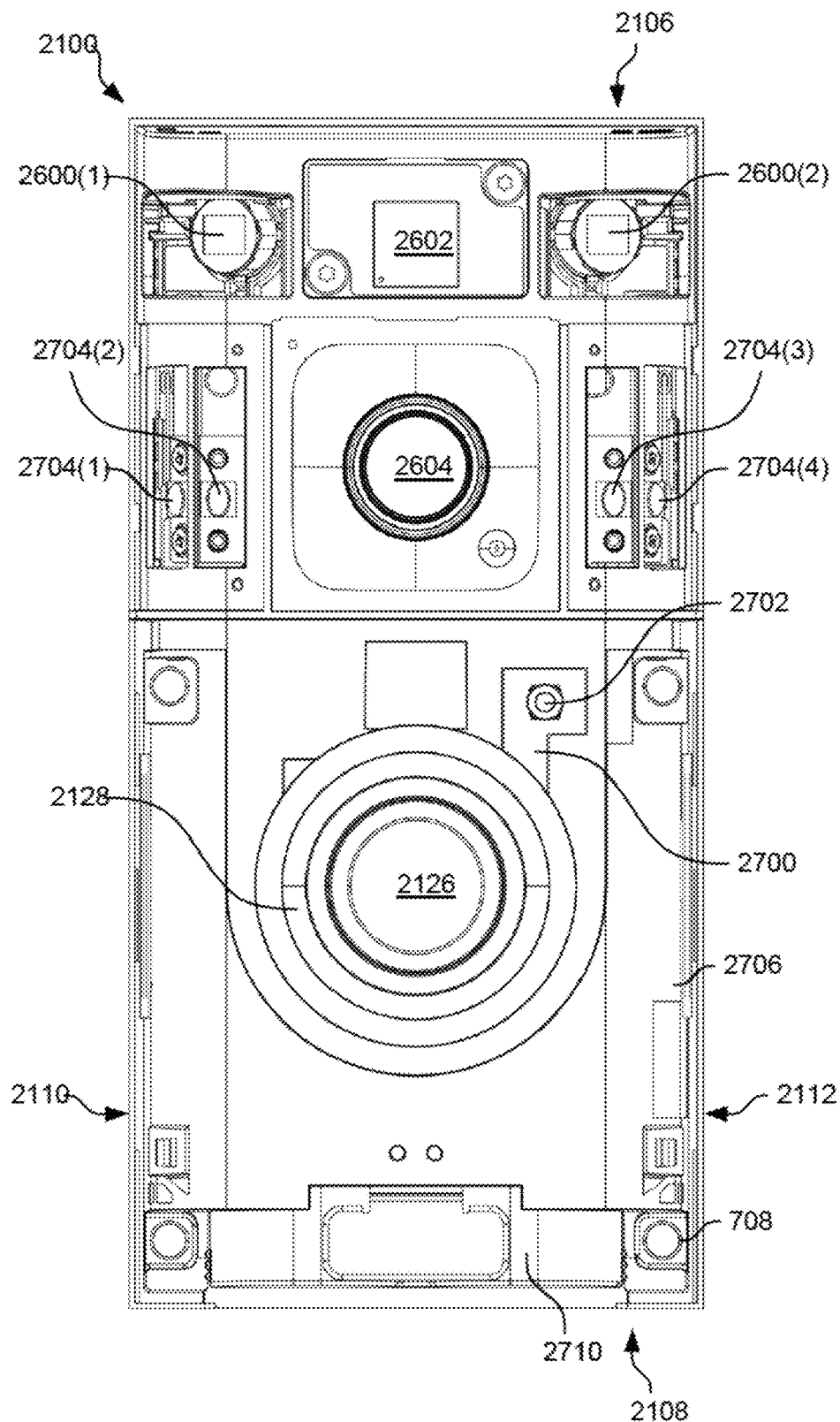
Figure 14:
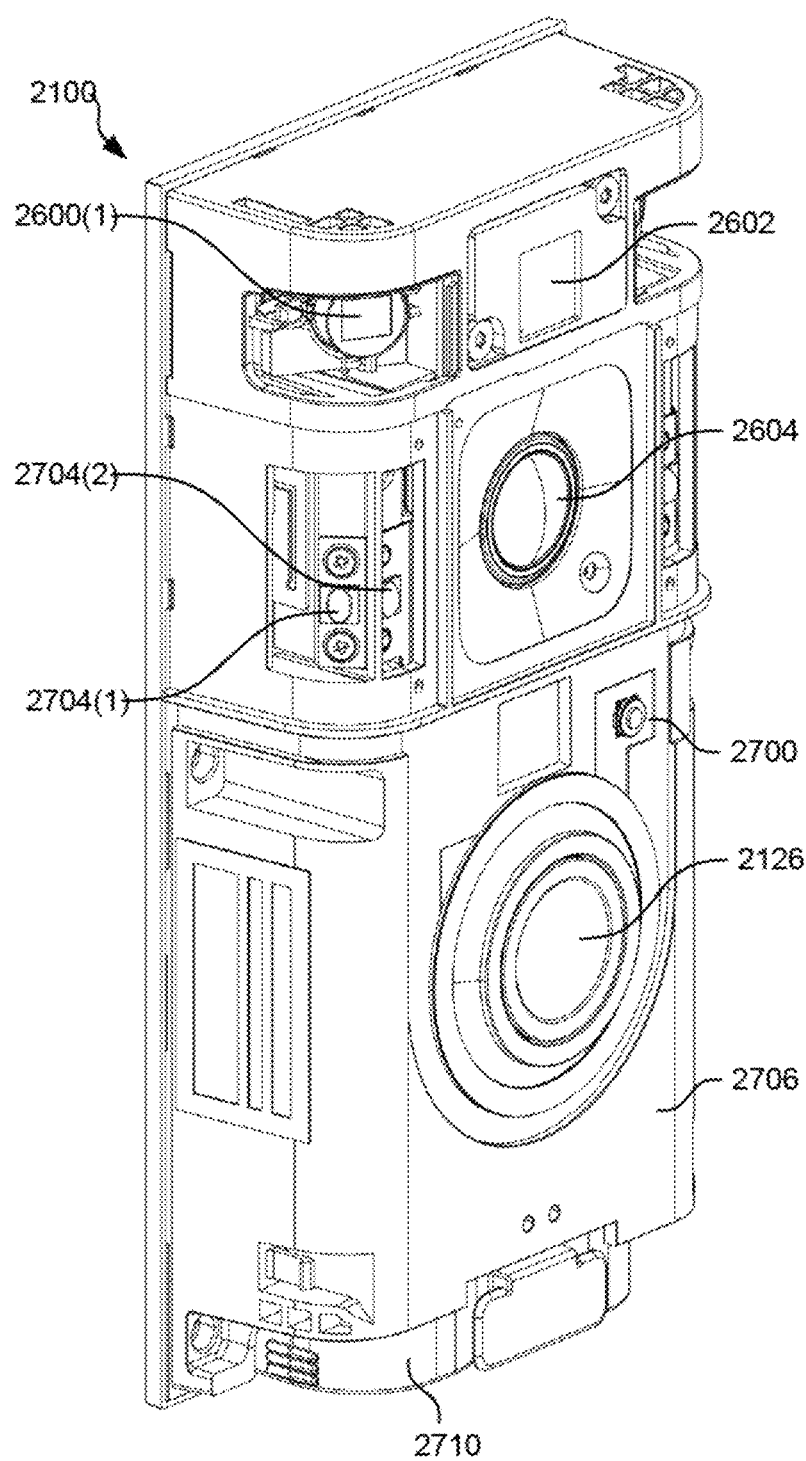
Figure 15:
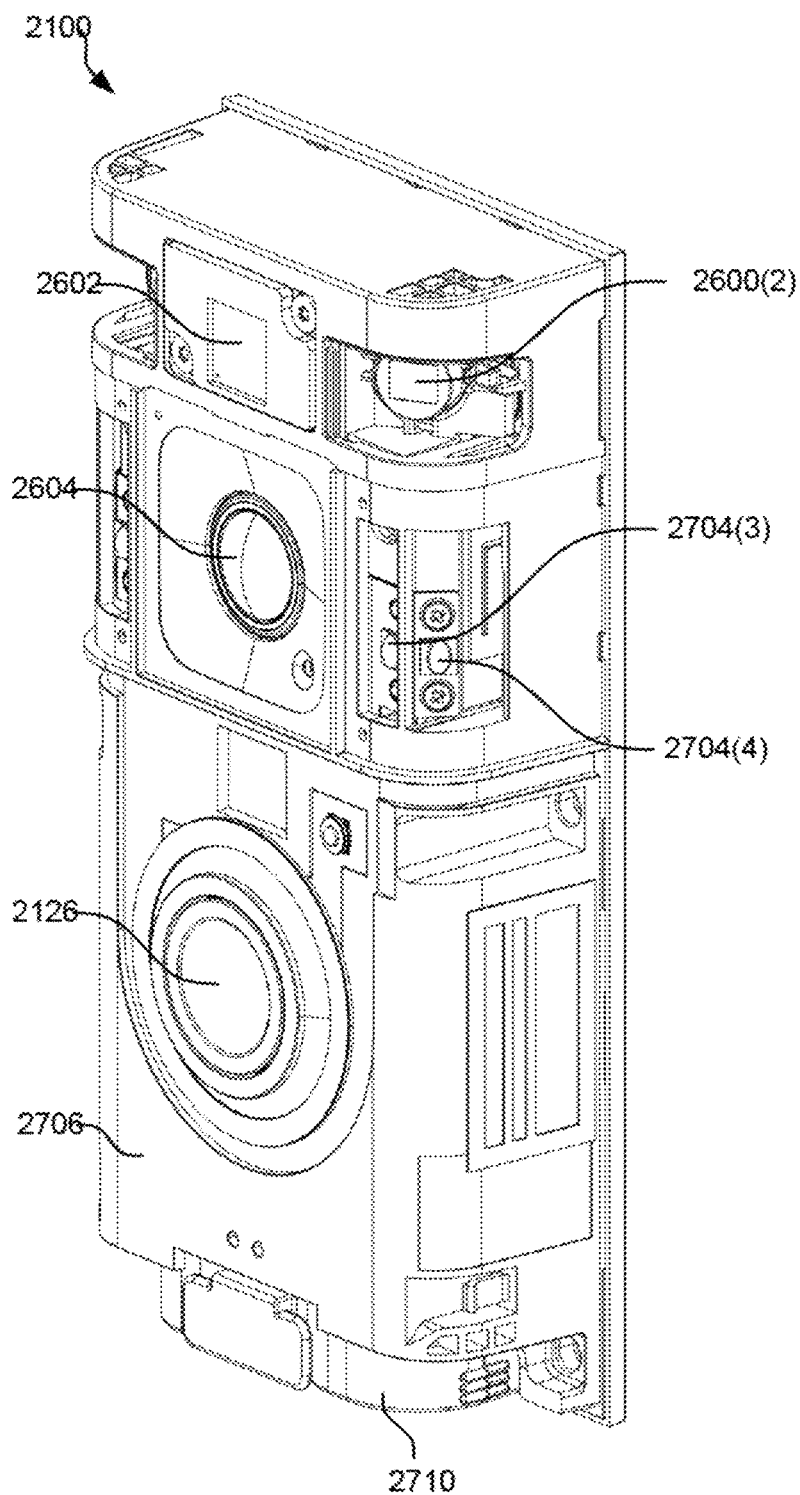

FIGS. 13-15 illustrate the device 2100, showing one or more covers and lenses removed to illustrate components of the device 2100.

The device 2100 includes a first PIR sensor 2600(1), a second PIR sensor 2600(2), and a RADAR sensor 2602 arranged beneath the first cover 2116. The PIR sensor(s) 2600 are oriented to sense motion in front of and/or to the sides of the device 2100, for example, via sensing mid-IR light emitted by persons. The first PIR sensor 2600(1) may be oriented towards the front and/or the first side 2110, while the second PIR sensor 2600(2) may be oriented towards the front and/or the second side 2112. The RADAR sensor 2602 may be disposed between the first PIR sensor 2600(1) and the second PIR sensor 2600(2). In some instances, the RADAR sensor 2602 may be used to determine polar coordinates (or a position) of persons. In some instances, the RADAR sensor 2602 may enable the device 2100 to focus on object detection and capabilities to operation in low power modes. In some instances, the first PIR sensor 2600(1), the second PIR sensor 2600(2), and/or the RADAR sensor 2602 are horizontally aligned.

The device 2100 also includes an imaging sensor 2604 (e.g., camera, depth sensor, etc.) arranged beneath a lens. As shown, the imaging sensor 2604 may be disposed between the RADAR sensor 2602 and the button 2126. In some instances, the imaging sensor 2604 is vertically aligned with the RADAR sensor 2602 and/or the button 2126. In some instances, the imaging sensor 2604, the PIR sensor(s) 2600, and/or the RADAR sensor 2602 may be used in combination to detect persons, and in response, capture video and/or audio data. For example, upon mid-IR (e.g., motion) being detected via the PIR sensor(s) 2600, the imaging sensor 2604 may begin recording video/image data.

As discussed above, the button 2126 may be oriented in the first direction (e.g., outwards from the front 2102). In some instances, the imaging sensor 2604 and the RADAR sensor 2602 may additionally be oriented in the first direction. The first speaker may be oriented in the second direction, outward from the first side 2110, and the second speaker may be oriented in the third direction, outward from the second side 2112. In some instances, the first PIR sensor 2600(1) may be oriented in a fourth direction that is different than the first direction and the second direction, and the second PIR sensor 2600(2) may be oriented in a fifth direction that is different than the first direction and the third direction. In some instances, the fourth direction is oriented at forty-five degrees from the first direction and/or the fifth direction is oriented at forty-five degrees from the first direction.

The device 2100 includes a flexible printed circuit (FPC) 2700 arranged beneath a cover. In some instances, the button 2126 communicatively connects to, or is disposed on, the FPC 2700. Additionally, as will be discussed herein lighting elements that emit light through the light ring 2128 may be disposed on the FPC 2700. The FPC 2700 may also include a button 2702, which in some instances, may correspond to a setup button of the device 2100. The button 2702 may be accessed via removing a cover, for example, during setup of the device 2100.

The device 2100 includes one or more IR lighting elements 2704, such as a first IR lighting element 2704(1), a second IR lighting element 2704(2), a third IR lighting element 2704(3), and a fourth IR lighting element 2704(4). In some instances, the first IR lighting element 2704(1) and the second IR lighting element 2704(2) are disposed beneath the third cover 2130, while the third IR lighting element 2704(3) and the fourth IR lighting element 2704(4) may be disposed beneath the fourth cover 2132. As such, the first IR lighting element 2704(1) and the second IR lighting element 2704(2) may be disposed on a first side of the imaging sensor 2604, while the third IR lighting element 2704(3) and the fourth IR lighting element 2704(4) may be arranged on a second side of the imaging sensor 2604. In some instances, the first IR lighting element 2704(1) is arranged to output light from the first side 2110 of the device 2100, while the second IR lighting element 2704(2) is arranged to output light from the front 2102 of the device 2100. Additionally, or alternatively, in some instances, the third IR lighting element 2704(3) is arranged to output light from the front 2102 of the device 2100, while the fourth IR lighting element 2704(4) is arranged to output light from the second side 2112 of the device 2100.

In some instances, the first IR lighting element 2704(1), the second IR lighting element 2704(2), the third IR lighting element 2704(3), and the fourth IR lighting element 2704(4) are horizontally aligned. In some instances, the IR lighting elements 2704 are arranged closer to the top 2106 of the device 2100 than the bottom 2108. Additionally, or alternatively, the imaging sensor 2604 may be located closer to the top 2106 of the device 2100 than the IR lighting elements 2704. Although a certain number of the IR lighting elements 2704 are shown, the device 2100 may include more than or less than four of the IR lighting elements 2704. Additionally, the IR lighting elements 2704 may be arranged differently than shown.

The device 2100 may include a housing 2706 to which components of the device 2100 couple. The housing 2706 may define various openings, channels, passages, flanges, mounts, etc. to which components of the device 2100 couple. For example, the housing 2706 may define apertures through which the IR lighting elements 2704 are arranged to output light into the environment. The housing 2706 may define channels 2708 through which fasteners are disposed for coupling the device 2100 to a surface. The channels 2708 may be aligned with channels of a base plate. Additionally, the housing 2706 may define a receptacle within which a battery 2710 of the device 2100 can be removably received.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.) The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A camera device comprising:
   a camera;
   a vertical cavity surface emitting laser (VCSEL) array comprising
      a first segment including a first set of emitter portions,
      a second segment including a second set of emitter portions,
      a first wire bonding area associated with the first set of emitter portions,
      a second wire bonding area associated with the second set of emitter portions;
   a first wire coupled to the first wire bonding area;
   a second wire coupled to the second wire bonding area;
   an aspheric lens disposed proximate the VCSEL array;
   one or more processors;
   one or more non-transitory computer readable media storing processor-executable instructions which, when executed by the one or more processors, cause the camera device to perform operations comprising
      accessing image data generated by the camera, the image data comprising first image data that corresponds to a first portion of a field of view (FOV) of the camera and second image data that corresponds to a second portion of the FOV of the camera; and
      excluding an area of the FOV of the camera from illumination adjustments, based on elements of image data generated by the camera and corresponding elements prior image data generated by the camera indicating that the area of the FOV of the camera exceeded an illumination threshold for greater than a threshold period of time;
      determining, based on the first image data generated by the camera that corresponds to the first portion of the FOV of the camera, a first target current value,
      causing modification of an amount of current provided over the first wire based on the first target current value,
      determining, based on the second image data generated by the camera that corresponds to the second portion of the FOV of the camera, a second target current value,
      causing modification of an amount of current provided over the second wire based on the second target current value.

2. The camera device of claim 1, wherein the camera device comprises:
   driver circuitry comprising
      a current supply line coupled to a power line,
      an input bus line coupled to a bus line,
      a first output line coupled to the first wire, and
      a second output line coupled to the second wire;
   wherein the driver circuitry is adapted to
      switch coupling of the current supply line to the first output line to provide a first pulse width modulation signal for the first segment over the first wire, a pulse width of the first pulse width modulation signal being based on first input received via the input bus line, and
      switch coupling of the current supply line to the second output line to provide a second pulse width modulation signal for the second segment over the second wire, a pulse width of the second pulse width modulation signal being based on second input received via the input bus line.

3. The camera device of claim 1, wherein the VCSEL array is adapted to emit infrared light, and wherein the camera device further comprises a dual band infrared filter with a narrow notch.

4. A camera device comprising:
a camera;
a vertical cavity surface emitting laser (VCSEL) array comprising
a first segment including a first set of emitter portions, and
a second segment including a second set of emitter portions;
a first wire coupled to the VCSEL array and associated with the first set of emitter portions;
a second wire coupled to the VCSEL array and associated with the second set of emitter portions;
a lens disposed proximate the VCSEL array;
one or more processors;
one or more non-transitory computer readable media storing processor-executable instructions which, when executed by the one or more processors, cause the camera device to perform operations comprising
accessing image data generated by the camera, the image data comprising first image data that corresponds to a first portion of a field of view (FOV) of the camera and second image data that corresponds to a second portion of the FOV of the camera; and
excluding an area of the FOV of the camera from illumination adjustments, based on elements of image data generated by the camera and corresponding elements prior image data generated by the camera indicating that the area of the FOV of the camera exceeded an illumination threshold for greater than a threshold period of time;
determining, based on the first image data generated by the camera that corresponds to the first portion of the FOV of the camera, a first target electrical value,
causing modification of an amount of current provided over the first wire based on the first target electrical value,
determining, based on the second image data generated by the camera that corresponds to the second portion of the FOV of the camera, a second target electrical value,
causing modification of an amount of current provided over the second wire based on the second target electrical value.

5. The camera device of claim 4, wherein the first target electrical value is a first target current value, and the second target electrical value is a second target current value.

6. The camera device of claim 4, wherein the first target electrical value is a first target voltage value, and the second target electrical value is a second target voltage value.

7. The camera device of claim 6, wherein the camera device comprises:
driver circuitry comprising
a current supply line coupled to a power line,
an input bus line coupled to a bus line,
a first output line coupled to the first wire, and
a second output line coupled to the second wire.

8. The camera device of claim 6, wherein the camera device comprises:
driver circuitry comprising
a current supply line coupled to a power line,
an input bus line coupled to a bus line,
a first output line coupled to the first wire, and
a second output line coupled to the second wire;
wherein the driver circuitry is adapted to
switch coupling of the current supply line to the first output line to provide a first pulse width modulation signal for the first segment over the first wire, a pulse width of the first pulse width modulation signal being based on first input received via the input bus line, and
switch coupling of the current supply line to the second output line to provide a second pulse width modulation signal for the second segment over the second wire, a pulse width of the second pulse width modulation signal being based on second input received via the input bus line.

9. The camera device of claim 6, wherein the VCSEL array comprises nine segments each including a respective set of emitter portions, the first and second segments being segments of the nine segments.

10. The camera device of claim 9, wherein the nine segments are arranged in a 3×3 configuration.

11. The camera device of claim 4, wherein the lens is aligned with an optical center of the VCSEL array.

12. The camera device of claim 4, wherein the VCSEL array is adapted to emit infrared light, and wherein the camera device further comprises a dual band infrared filter with a narrow notch.

13. The camera device of claim 12, wherein the narrow notch corresponds to around 850 nm.

14. The camera device of claim 4, wherein the one or more non-transitory computer readable media store processor-executable instructions which, when executed by the one or more processors, cause the camera device to perform operations comprising
determining an automatic exposure control luma target value,
determining an automatic exposure control sensor gain value,
determining, based on the first image data, a first luma estimate value for a first channel associated with the first portion of the FOV of the camera,
determining a gain target threshold,
wherein the first target electrical value is determined based on the automatic exposure control luma target value, the automatic exposure control sensor gain value, the first luma estimate value for the first channel, and the gain target threshold.

15. The camera device of claim 4, wherein the one or more non-transitory computer readable media store processor-executable instructions which, when executed by the one or more processors, cause the camera device to perform operations comprising
determining an automatic exposure control luma target value,
determining an automatic exposure control sensor gain value,
determining, based on the first image data, a first luma estimate value for a first channel associated with the first portion of the FOV of the camera,
determining, based on the second image data, a second luma estimate value for a second channel associated with the second portion of the FOV of the camera,
determining a gain target threshold,
wherein the first target electrical value is determined based on the automatic exposure control luma target value, the automatic exposure control sensor gain value, the first luma estimate value for the first channel, and the gain target threshold;

wherein the second target electrical value is determined based on the automatic exposure control luma target value, the automatic exposure control sensor gain value, the second luma estimate value for the second channel, and the gain target threshold.

16. A camera device comprising:
a camera;
a vertical cavity surface emitting laser (VCSEL) array comprising
  a first segment including a first set of emitter portions, and
  a second segment including a second set of emitter portions;
a lens disposed proximate the VCSEL array;
driver circuitry coupled to the VCSEL array;
one or more processors;
one or more non-transitory computer readable media storing processor-executable instructions which, when executed by the one or more processors, cause the camera device to perform operations comprising
  accessing image data generated by the camera, the image data comprising first image data that corresponds to a first portion of a field of view (FOV) of the camera and second image data that corresponds to a second portion of the FOV of the camera; and
  excluding an area of the FOV of the camera from illumination adjustments, based on elements of image data generated by the camera and corresponding elements prior image data generated by the camera indicating that the area of the FOV of the camera exceeded an illumination threshold for greater than a threshold period of time;
  determining, based on the first image data generated by the camera that corresponds to the first portion of the FOV of the camera, a first target electrical value, and
  sending a first signal to the driver circuitry based on the first target electrical value.

17. The camera device of claim 16, wherein the driver circuitry comprises
a current supply line coupled to a power line,
an input bus line coupled to a bus line,
a first output line coupled to a first wire associated with the first segment, and
a second output line coupled to a second wire associated with the second segment;
wherein the first signal is sent over the bus line.

18. The camera device of claim 17, wherein the driver circuitry is adapted to
  switch coupling of the current supply line to the first output line to provide a first pulse width modulation signal for the first segment over the first wire, a pulse width of the first pulse width modulation signal being based on first input received via the input bus line, and
  switch coupling of the current supply line to the second output line to provide a second pulse width modulation signal for the second segment over the second wire, a pulse width of the second pulse width modulation signal being based on second input received via the input bus line.

19. The camera device of claim 16, wherein the one or more non-transitory computer readable media store processor-executable instructions which, when executed by the one or more processors, cause the camera device to perform operations comprising
  determining an automatic exposure control luma target value,
  determining an automatic exposure control sensor gain value,
  determining, based on the first image data, a first luma estimate value for a first channel associated with the first portion of the FOV of the camera,
  determining a gain target threshold,
  wherein the first target electrical value is determined based on the automatic exposure control luma target value, the automatic exposure control sensor gain value, the first luma estimate value for the first channel, and the gain target threshold.

20. The camera device of claim 16, wherein the VCSEL array is adapted to emit infrared light, and wherein the camera device further comprises a dual band infrared filter with a narrow notch.

21. The camera device of claim 20, wherein the narrow notch corresponds to around 850 nm.

* * * * *